(12) United States Patent
Hersman et al.

(10) Patent No.: US 11,855,406 B2
(45) Date of Patent: Dec. 26, 2023

(54) GASEOUS LASER SYSTEMS WITH EDGE-DEFINING ELEMENT AND RELATED TECHNIQUES

(71) Applicant: Xemed LLC, Durham, NH (US)

(72) Inventors: F. William Hersman, Durham, NH (US); Jan H. Distelbrink, Peabody, MA (US)

(73) Assignee: XEMED LLC, Durham, NH (US)

( * ) Notice: Subject to any disclaimer, the term of this patent is extended or adjusted under 35 U.S.C. 154(b) by 0 days.

(21) Appl. No.: 17/710,424

(22) Filed: Mar. 31, 2022

(65) Prior Publication Data

US 2023/0318251 A1    Oct. 5, 2023

(51) Int. Cl.
| | |
|---|---|
| *H01S 3/0941* | (2006.01) |
| *H01S 3/104* | (2006.01) |
| *H01S 3/03* | (2006.01) |
| *H01S 3/0943* | (2006.01) |
| *H01S 3/034* | (2006.01) |

(52) U.S. Cl.
CPC .............. *H01S 3/104* (2013.01); *H01S 3/031* (2013.01); *H01S 3/034* (2013.01); *H01S 3/0941* (2013.01); *H01S 3/0943* (2013.01)

(58) Field of Classification Search
CPC ...... H01S 3/0943; H01S 3/0941; H01S 3/034; H01S 3/031; H01S 3/104
See application file for complete search history.

(56) References Cited

U.S. PATENT DOCUMENTS

| | | | |
|---|---|---|---|
| 9,653,869 B1* | 5/2017 | Hersman | .................. H01S 3/031 |
| 11,031,745 B1* | 6/2021 | Durst | ........................ H05G 2/00 |
| 2015/0110146 A1* | 4/2015 | Gronenborn | ........ H01S 3/09415 372/75 |
| 2017/0256913 A1* | 9/2017 | Garnache-Creuillot | ..................... H01S 3/1065 |

OTHER PUBLICATIONS

Auslender, "General model of DPAL output power and beam quality dependence on pump beam parameters:experimental and theoretical" 2018,Journal of the optical society of America B, vol. 35, No. 12, p. 3134-3142. (Year: 2018).*

* cited by examiner

*Primary Examiner* — Michael Carter
(74) *Attorney, Agent, or Firm* — Hayes Soloway PC

(57) ABSTRACT

Gaseous laser systems and related techniques are disclosed. Techniques disclosed herein may be utilized, in accordance with some embodiments, in providing a gaseous laser system with a configuration that provides (A) pump illumination with distinct edge surfaces for an extended depth and (B) an output beam illumination from a resonator cavity with distinct edges in its reflectivity profile, thereby providing (C) pump beam and output beam illumination on a volume so that the distinct edge surfaces of its pump and beam illumination are shared-edge surfaces with (D) further edge surfaces of the amplifier volume at the surfaces illuminated directly by the pump or output beams, as defined by optical windows and (optionally) by one or more flowing gas curtains depleted of the alkali vapor flowing along those optical windows. Techniques disclosed herein may be implemented, for example, in a diode-pumped alkali laser (DPAL) system, in accordance with some embodiments.

24 Claims, 11 Drawing Sheets

GASEOUS LASER SYSTEMS WITH EDGE-DEFINING ELEMENT AND RELATED TECHNIQUES

FIELD OF THE DISCLOSURE

The present disclosure relates to laser systems and more particularly to flowing gas amplifier laser systems, such as diode-pumped alkali laser (DPAL) systems.

BACKGROUND

Diode-pumped lasers typically employ laser diodes as the pump beam source. Some of these lasers, such as diode-pumped alkali lasers (DPALs), employ a gaseous lasing medium including an alkali metal vapor. Diode pumping can be provided in a longitudinal manner (i.e., pump light enters the lasing medium through a surface that is shared with the output beam) or a transverse manner (e.g., pump light enters the lasing medium through a surface that is not shared with the output beam).

SUMMARY

The subject matter of this application may involve, in some cases, interrelated products, alternative solutions to a particular problem, and/or a plurality of different uses of a single system or article.

One example embodiment provides a gaseous laser system. The gaseous laser system includes an unstable resonator. The gaseous laser system also includes a lasing amplifier disposed in an optical pathway of the unstable resonator, wherein the lasing amplifier includes an optical window assembly through which a flowing lasing gas passes in operation of the gaseous laser system. The gaseous laser system also includes a pump beam source configured to emit a pump beam including pump light. The gaseous laser system also includes an edge-defining element configured to define an edge of the pump light such that a resultant pump beam is delivered to the flowing lasing gas in the lasing amplifier.

In some cases, the edge-defining element includes a mirror assembly disposed near an intersection of the pump beam and the optical pathway of the unstable resonator and configured to have the pump beam incident therewith. In some instances, the mirror assembly is configured to reflect at least a portion of the pump beam so as to define the edge of pump light incident therewith.

In some cases, the edge-defining element includes an assembly of optical elements disposed outside of the optical pathway of the unstable resonator and configured to have the pump beam pass therethrough. In some instances, the assembly of optical elements is configured to at least one of refractively optically transport and reflectively optically transport at least a portion of the pump beam so as to define the edge of pump light incident therewith. In some instances, the assembly of optical elements is configured to form an image of at least a portion of the pump beam so as to define the edge of pump light incident therewith.

In some cases, the gaseous laser system is configured to have at least one flowing gas curtain pass over an interior surface of the optical window assembly in a region through which the pump beam passes in operation of the gaseous laser system. In some instances, the at least one flowing gas curtain includes an inactive gas. In some instances, the at least one flowing gas curtain is configured to have the pump beam incident therewith so as to define the edge of pump light incident therewith.

In some cases, the pump beam source is configured for longitudinal pumping of the lasing amplifier. In some other cases, the pump beam source is configured for transverse pumping of the lasing amplifier. In some cases, the gaseous laser system is configured as a diode-pumped alkali laser (DPAL), and the flowing lasing gas includes a vapor of an alkali metal.

Another example embodiment provides a method of optically pumping a gaseous laser system. The method includes emitting a pump beam including pump light. The method also includes defining an edge of the pump light. The method also includes delivering a resultant pump beam to a flowing lasing gas of the gaseous laser system.

In some cases, defining the edge of the pump light involves a reflection process. In some instances, the reflection process includes reflecting at least a portion of the pump beam off a mirror before delivering the resultant refined pump beam to the flowing lasing gas.

In some cases, defining the edge of the pump light involves at least one of a refractive optical transport process and a reflective optical transport process. In some instances, the at least one of the refractive optical transport process and the reflective optical transport process includes focusing the pump beam through at least one lens before delivering the resultant pump beam to the flowing lasing gas.

In some cases, in delivering the resultant pump beam to the flowing lasing gas, the resultant pump beam passes through at least one flowing gas curtain provided adjacent to the flowing lasing gas. In some instances, the at least one flowing gas curtain includes an inactive gas.

In some cases, emitting the pump beam involves a longitudinal pumping process in which the pump beam and an output beam of the gaseous laser system are transmitted through at least one shared optical window. In some other cases, emitting the pump beam involves a transverse pumping process in which the pump beam and an output beam of the gaseous laser system are transmitted through different optical windows. In some cases, the gaseous laser system is configured as a diode-pumped alkali laser (DPAL), and the flowing lasing gas includes a vapor of an alkali metal.

Another example embodiment provides a gaseous laser. The gaseous laser includes a gain medium with an interior volume within the substance of the gain medium that is illuminated by one or more pump laser source(s) entering the volume. The gaseous laser also includes edge surfaces fully enclosing the interior volume where the gain of the medium changes from a low value to a high value. The gaseous laser further includes one or more pump light sources whose illumination of the interior volume of the gain medium has an intensity distribution in the plane perpendicular to its direction of propagation that is configured to transition abruptly from low to high intensity (e.g., the edge of the pump beam), thereby delineating one or more edge surfaces of the gain medium, where the transition in pump illumination defines that surface.

In some cases, the gaseous gain medium is flowing so that the streamlines of the flow define planes that are also edge surfaces where the gain of the medium changes from a low value to a high value, and one or more additional surface of the gain medium are defined by the edge of the pump beam (i.e., a spatially abrupt transition in pump light intensity).

In some cases, the configuration is one of longitudinal pumping (e.g., pump light enters the gain medium through a surface that is shared with the output beam), the surfaces where the pump beam and output beam cross the medium boundary and enter/exit the medium are defined by flow streamlines along the windows, with or without a flowing inactive gas curtain, and the perimeter surface enclosing and defining the pump region in the plane perpendicular to the pump beam and output beam is defined at least partially by a spatially abrupt transition in pump light intensity (e.g., the edge of the pump beam). In some such instances, the illumination pattern of the laser output beam formed by the unstable resonator (e.g., the magnified image of the output coupling mirror reflected from the high-reflectivity mirror) coincides with the perimeter surface that encloses the pumped region.

In some cases, the configuration is one of transverse pumping (e.g., pump light enters the gain medium through a surface that is not shared with the output beam), the surface(s) where the pump beam crosses the medium boundary and enters the medium are defined by flow streamlines along the windows, with or without a flowing inactive gas curtain, the surface(s) where the output beam crosses the medium boundary and enters/exits the medium are defined by flow streamlines along the windows, with or without a flowing inactive gas curtain, and the perimeter defining the pump region along the gas flow direction is defined at least partially by a spatially abrupt transition in pump light intensity. In some such instances, the illumination pattern of the output beam formed by the unstable resonator (e.g., the magnified image of the output coupling mirror reflected from the high-reflectivity mirror) coincides with the rectilinear surface that encloses the pumped region.

In some cases, the illumination pattern of the pump beam within the pumped region is approximately uniform. In some cases, the illumination transition from low to high intensity (e.g., the edge of the pump beam) is more narrowly defined using a mirror, thereby confining pump light to be inside the medium boundary that otherwise would diverge beyond the surface of the gain region. In some cases, the mirror placement confines the pump light to a circular, polygonal, rectangular, oval, or circular illumination pattern. In some cases, the mirror placement confines the pump light to a rectangular illumination pattern. In some cases, the placement of lenses confines the pump light to a rectangular illumination pattern. In some cases, the flow defines the amplifier medium substance with planar edge surfaces including windows and/or flowing gas curtains, where the output beam includes parallel rays with a perimeter defined by the geometry of the unstable resonator, and the pump beam is tailored to have abrupt edges so that the amplifier gain medium includes the volumetric intersection of the flowing lasing gas, the pump beam, and the output beam.

In some cases, the pump source is oriented such that the edge of its illumination along the fast-axis direction, which has lower divergence and better spatial definition than that of its slow axis, is directed so as to define one or more edge surfaces of the pump light along the gas flow direction, thereby forming one or more edges of the interior volume of the gain medium for an extended depth at the lasing gas flow entrance and exit.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
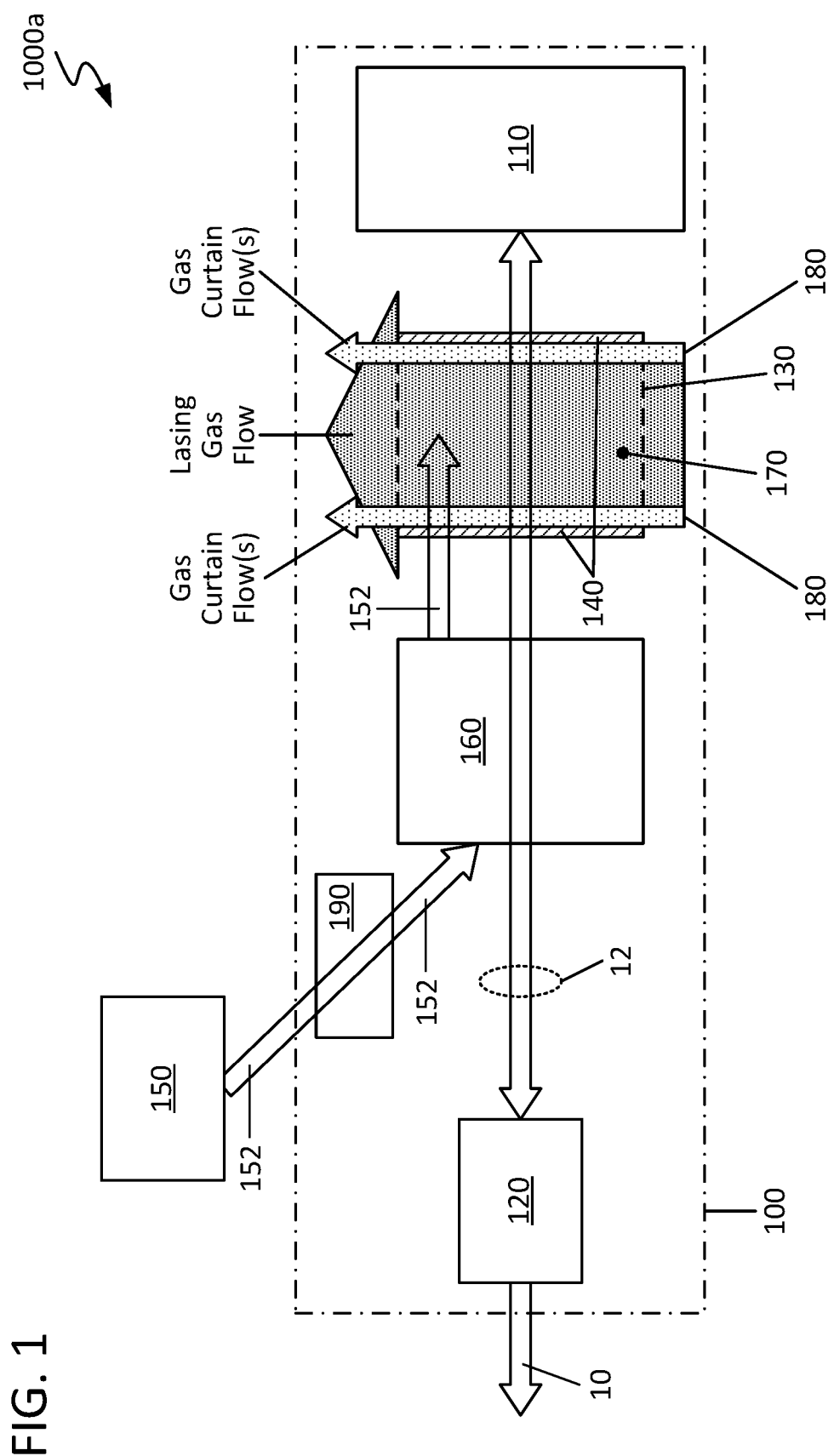
FIG. 1 illustrates a gaseous laser system configured for longitudinal pumping, in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Gaseous laser systems and related techniques are disclosed. Techniques disclosed herein may be utilized, in accordance with some embodiments, in providing a gaseous laser system with a configuration that provides (A) pump illumination with distinct edge surfaces for an extended depth and (B) an output beam illumination from a resonator cavity with distinct edges in its reflectivity profile, thereby providing (C) pump beam and output beam illumination on a volume so that the distinct edge surfaces of its pump and beam illumination are shared-edge surfaces with (D) further edge surfaces of the amplifier volume at the surfaces illuminated directly by the pump or output beams, as defined by optical windows and (optionally) by one or more flowing gas curtains depleted of the alkali vapor flowing along those optical windows. Techniques disclosed herein may be implemented, for example, in a diode-pumped alkali laser (DPAL) system, in accordance with some embodiments. Numerous configurations and variations will be apparent in light of this disclosure.

General Overview

Diode-pumped alkali lasers (DPALs) offer a promising technology for implementing a single-aperture beam with favorable characteristics. Since a DPAL is a gas laser, it does not suffer from many of the power limitations of solid lasers, such as thermal lensing. The transitions of interest are in the near-infrared, which is shorter in wavelength than existing approaches, so that the diffraction-limited output beam may propagate a greater distance for a given divergence. The difference between the energy of the pump photon and the output beam photon—the quantum defect energy between the P3/2 and P1/2 levels—is only of order a couple percent of their average, offering the potential for very high optical-to-optical conversion efficiencies.

Alkali atoms cycle among three levels to convert pump photons to beam photons. They are (i) resonantly pumped to the second excited state (the P3/2 level), (ii) collisionally quenched to the lasing state (the P1/2 level), and then (iii) transition to the ground state (the S1/2 level), thereby delivering amplification to the output beam. In the limit of very high pump and output beam intensity, and with high collisional quenching rate, the cycle rate can far exceed the natural decay rate associated with maintaining a continuous population in the P-states. In this limit, the optical-to-optical efficiency approaches the quantum defect fraction (i.e., the difference between the P3/2 and P1/2 level energies divided by their average) of a couple percent. However, there is also a threshold that must be overcome—the pump beam must have sufficient intensity to "bleach" the levels, achieving the population inversion that is required before lasing begins. Due to the constant rate of natural spontaneous decay of the excited states, this penalty to the optical-to-optical efficiency is always present at a constant energy loss rate. In some configurations, the output beam in the amplifier region exceeds the pump intensity. Consequently, the higher the pump intensity that is achieved above lasing threshold, the greater the portion of the pump beam that can be converted to output beam.

These considerations have led practitioners to design and implement DPAL pump illumination distributions that seek high efficiency by concentrating the pump light to maximize the pump intensity. Similar logic applies to concentrating the intensity of the output beam in the region where the pump light is most intense. For example, consider FIG. 12A, which illustrates an existing approach to pump beam intensity distribution for an existing DPAL system. Here, the pump beam intensity impinges on a flowing lasing gas as a function of position along one-dimension (e.g., the slow-axis dimension of a pump array consisting of several diode array bar stacks). As can be seen, the pump beam intensity is maximized in the center and made as spatially narrow as possible. This illumination pattern may be accomplished, for example, by inclining several diode array bar stacks so that their central rays meet at the same spot when they reach the flowing lasing gas. The distribution may have different widths along the vertical and horizontal directions, which may be associated with the fast and slow axes of the pump array. After collimation by a fast-axis collimating lens, the propagation in the fast axis has very low divergence, so that the illumination pattern along this direction is determined primarily by the height of the stack and directional pointing. The propagation in the slow axis, however, has much larger divergence. Constraining the dimension of the spatial illumination pattern along the slow axis has led to the perceived requirement that the pump laser stacks be positioned close to the amplifier region. Increasing the number of stacks illuminating the amplifier region while maintaining proximity results in placing the stack arrangement to fill a conical pattern out to angles that approach 45°. The convergence of these paths is optimally placed at the center of the amplifier, diverging rapidly with displacement from the center and decreasing in intensity away from this central point. Consequently, the depth of the amplifier region has been limited to only a few centimeters.

This existing strategy which maximizes the pump intensity within a small region does not lead to maximum performance of the full system. On an atomic level, the cycle rate depends not only on the pump intensity, but also the quenching rate between the P3/2 and P1/2 levels, and the lasing beam intensity. Each atom can absorb a pump beam photon only as fast as it can deliver it to the output beam. The quenching rate is uniform, being determined by the pressure of the helium buffer/quenching gas and the partial pressure of any (optional) hydrocarbon or fluorocarbon molecular quenching agent. Then, on a local level, full absorption of the pump beam depends on the optical thickness: the concentration of the alkali atoms (in the absorbing ground state) times the physical thickness of the medium. However, if the pump beam has an intensity maximum, then it also will have regions where the intensity drops off with distance from that maximum. Unfortunately, the optimal choice of optical thickness also drops with distance. For an operating DPAL, it is not feasible to vary the optical thickness. The amplifier region in such a system must be chosen with a single alkali vapor concentration that is a compromise between the choice that would be optimal for the region of greatest pump intensity and the regions with lesser pump intensity. Such a compromise can result in the pump beam penetrating completely through the gain medium in regions where it is most intense, while regions of the amplifier where the pump beam is less intense have alkali concentrations that are unfavorably high. As the pump beam attenuates passing through the amplifier in these regions, it may not even exceed lasing threshold near the rear of the amplifier.

The output beam is generally formed in a resonator—a cavity with two mirrors (i.e., a high-reflectivity mirror and an output coupler mirror) that define the output beam direction. An unstable resonator is characterized by a magnification whose absolute value exceeds unity. As the beam reflects between the mirrors, the illumination pattern is magnified so that power escapes outside the perimeter of the output coupling mirror. The illumination pattern returning to the high-reflectivity mirror from the output coupler is defined by the reflectivity profile of the output coupler, which drops to zero reflectivity at its perimeter. After reflecting off the output coupler (and optionally passing through an intermediate focus), the beam diverges while passing back through the amplifier medium, reaching its maximum transverse size as it reaches the high-reflectivity mirror. After reflecting off that mirror, the magnified beam becomes parallel, with an intensity profile and a perimeter defined by the magnified reflectivity and perimeter of the output coupler. As it passes through the amplifier medium, each region of the beam has its intensity modified according to the localized gain of the region it is passing through. Once it passes beyond the output coupler, the output beam consists of an annulus defined by the magnified beam pattern minus the reflected intensity removed from the central region. Since the central region may be only partially reflective, some fraction of the output power can pass through.

The size and shape of the perimeter of the unstable resonator cavity elements (e.g., the output coupler) can be chosen to achieve a given target performance of the DPAL. The size and shape of these elements may be chosen, for example, to extract beam from the pumped region and to avoid sending the output beam through regions of the flowing lasing gas that do not have sufficient pump intensity to achieve a population inversion. The optional choice of pump beam perimeter size and shape is a compromise if the pump intensity tapers from a maximum intensity (where excess pump beam penetrates through the amplifier medium thickness and emerges out the back under-utilized) to a lower intensity (where insufficient pump beam intensity is exhausted midway, leaving the rearmost layer of the amplifier medium without a population inversion). Indeed, if the cavity elements are chosen so that the output beam is too large, much of the output beam may be forced to propagate through regions of the amplifier medium with negative gain (i.e., attenuation).

The dimensions of the amplifier region, combined with the local population inversion, determine not only the gain through the system along the path of the output beam, but also provide gain in other directions. Spontaneous emission from either the P3/2 or P1/2 state to the S1/2 ground state is directionally isotropic and can be amplified due to the population inversions that are present in the system. This so-called amplified spontaneous emission (ASE) is a power loss mechanism that depletes the population inversions. Since the gain is exponential, the power out the sides of the amplifier medium becomes significant if the spatial size of the amplifier medium transverse to the beam direction (significantly) exceeds its dimension along the beam. The ratio of the dimension along the beam path to the transverse dimension is often termed the dimensional "aspect ratio." Current practice is limited to aspect ratios of approximately 1:2 (i.e., one-half).

Thus, and in accordance with some embodiments of the present disclosure, gaseous laser systems and related techniques are disclosed. Techniques disclosed herein may be utilized, in accordance with some embodiments, in providing a gaseous laser system with a configuration that provides (A) pump illumination with distinct edge surfaces for an extended depth and (B) an output beam illumination from a resonator cavity with distinct edges in its reflectivity profile, thereby providing (C) pump beam and output beam illumination on a volume so that the distinct edge surfaces of its pump and beam illumination are shared-edge surfaces with (D) further edge surfaces of the amplifier volume at the surfaces illuminated directly by the pump or output beams, as defined by optical windows and (optionally) by one or more flowing gas curtains depleted of the alkali vapor flowing along those optical windows. Techniques disclosed herein may be implemented, for example, in a diode-pumped alkali laser (DPAL) system, in accordance with some embodiments.

In accordance with some embodiments, systems disclosed herein may be configured, for example, with a gaseous laser with a flowing lasing gas (i.e., amplifier medium) that is optically pumped with diode laser arrays in an unstable resonator to form a single collimated output beam. In accordance with some embodiments, at least two of the surfaces of the amplifier volume may be defined by optical windows and (optionally) one or more flowing gas curtains such that the flowing lasing gas itself does not extend beyond those boundaries. In accordance with some embodiments, definition of the edge surfaces of (i) the pump beam and (ii) the output beam and co-locating those surfaces with one another and/or the edge surfaces of (iii) the flowing lasing gas may contribute to improvements in efficiency and power-in-bucket metrics.

In accordance with some embodiments, techniques disclosed herein may involve, for example, spatially matching laser pump illumination with the flowing lasing gas and unstable resonator beam formation geometries. In accordance with some embodiments, techniques disclosed herein may involve, for example, defining the edge surfaces of the amplifier volume and co-locating those surfaces wherever possible with the edge surfaces of (i) the pump beam, (ii) the output beam, and (iii) the flowing lasing gas.

In accordance with some embodiments, techniques disclosed herein may involve arranging pump laser(s) to have a sharp cutoff in the gas flow direction and making that edge surface substantially identical with the output beam, also with a sharp cutoff. As will be appreciated in light of this disclosure, that sharp cutoff may be achieved, for example, using the fast-axis edge of the pump laser beam, in accordance with some embodiments. If there is no optical transport, it still may provide a sufficiently sharp edge. Also, if there is no optical transport, the slow axis may be smeared out, and it may be desirable to utilize an end mirror, though that may impact the ability to achieve sufficient intensity. If, however, there is optical transport, then sufficient intensity above threshold may be achieved, for example, by concentrating the light in the fast-axis direction. This may be accomplished, for example, with a focusing pair (e.g., an afocal telescope).

In accordance with some embodiments, techniques disclosed herein may be implemented, for example, in a gaseous laser system (e.g., DPAL system) configured for longitudinal pumping. In such cases, the pump and output beams generally may define the x-y profile forming a given shape (e.g., square, rectangle, octagon, circle, etc.), while the z-direction may be delimited by optical windows and (optionally) flowing gas curtains where both beams come through. In accordance with some other embodiments, techniques disclosed herein may be implemented, for example, in a gaseous laser system (e.g., DPAL system) configured for transverse pumping. In such cases, the edges of both the pump and output beams generally may define the gas inflow and outflow boundaries of the amplifier regions, and optical windows and (optionally) flowing gas curtains generally may define all sides (e.g., four sides), together with a co-located edge of one of the beams (either pump or output). In at least some instances, the gas inflow and outflow boundaries along the gas flow direction generally may be due to the edge(s) of both the pump and output beams, in accordance with some embodiments. In at least some instances, at least one of the edges may be defined along the direction of the fast axis of the pump laser, which offers better definition in its spatial and angular distribution, thereby defining an edge surface for an extended depth. In accordance with some embodiments, techniques disclosed herein may be used to provide a DPAL system configured to illuminate a sharp cutoff at an edge surface in the gas flow direction.

As will be appreciated in light of this disclosure, recognizing the importance of definition and co-location of the edges of the pump and output beams with one another and with the edges of the amplifier for an extended depth runs counter to existing thinking and approaches. Some existing approaches include considerations for an output coupling optic with tapering reflectivity, intended to reduce the definition of the edge of the output beam (i.e., make it vaguer). Also, some existing approaches include considerations to reflect back into the amplifier medium that portion of the pump power from the central region of highest intensity that penetrates through the amplifier medium for a second pass to harvest its power, which is evidence that it was not optimized in the original design of such existing approaches. More specifically, some existing approaches seek to reduce pump beam spot size by adding custom prisms, angled in quadrants, that deflect beams that emanate from outer stripes on each bar inward toward the center along the slow axis and deflect beams that emanate from the outer bars on the diode array stack inward toward the center along the fast axis. The angled pump arrays produce a pumped gain region which has a spatial waist in the center of the amplifier region and grows transversely moving axially, towards the front and rear. For much of the amplifier length along the beam, the width exceeds the length, resulting in appreciable amplified spontaneous emission (ASE). Thus, an increase of either of these dimensions is counterintuitive. Regarding the output beam in a transversely pumped arrangement, some existing approaches have utilized a polygonal output coupler without concomitant considerations given to defining amplifier surfaces coinciding with that polygonal boundary, resulting in pumped regions with no stimulated emission from the output beam cavity. Some existing approaches also suffer from much of the output beam passing through regions of negative gain, especially near the perimeter, as described above.

Contrary to these existing approaches, and as disclosed herein, it may be desirable, at least in some instances, to achieve a pump beam intensity that is (A) uniformly high (B) in a given pattern/shape (C) out to well-defined edges (D) for an extended depth, in accordance with some embodiments. To accomplish this, it may be desirable, at least in some instances, to transport the pump beam's fast-axis light such that it illuminates a well-defined portion of the amplifier region such that the edge of that fast-axis illumination defines one or more edge surfaces for an extended depth. Another approach to that end is, in accordance with some embodiments, to de-magnify the pump beam light along the fast axis with an optical transport, concentrating its power. As the divergence of the fast and slow axes may differ, for instance, by a factor of one hundred, the increase in the fast-axis divergence that may result from this concentration of power still may permit the fast-axis illumination to sufficiently define an edge surface for an extended depth. Another approach is, in accordance with some embodiments, to magnify the slow-axis pump light with an optical transport, to increase its spatial size while reducing its divergence. This approach may allow the slow-axis light to provide improved definition of edge surfaces for an extended depth. While expanding the slow-axis light and maintaining pump intensity may require further compression of fast-axis light, this approach may provide a pump beam that has divergence along the slow axis that more closely matches that of the fast axis, so that the pump beam may propagate through an extended amplifier region while maintaining well-defined edge surfaces to a greater depth along both axes as closely as possible. As will be appreciated in light of this disclosure, some combination of these approaches may be utilized together to achieve a target pump intensity and spatial profile as a function of depth, in accordance with some embodiments. Furthermore, to allow significant de-magnification along the fast-axis direction while still achieving high intensity and a pump beam size along the fast axis comparable to that along the slow-axis direction, a design utilizing a pump beam source with a very asymmetric shape (e.g., a stack of many bars) may be desirable (at least in some cases), in accordance with some embodiments.

Another approach is to confine the slow-axis pump light with edge mirrors, in accordance with some embodiments. A pump light illumination pattern having a generally circular or polygonal shape may be provided, in accordance with some embodiments, by using the high-spatial definition of the fast-axis light to define the edge while diffusing the light propagating toward the center. In accordance with some embodiments, this arrangement may be augmented, for example, with a circumscribing mirror (or mirror array) to constrain stray or divergent pump light and reflect it back within the perimeter. In accordance with other embodiments, this arrangement may be augmented with a spatially defining mask, to absorb the tails of the pump beam, preventing them from delivering heat to the amplifier region, if their trajectory would prevent them from contributing to the output beam anyway.

As will be further appreciated in light of this disclosure, techniques disclosed herein may involve one or more generally counterintuitive concepts. For example, rather than incorporating elements and system refinements that narrow the spatial distribution of the pump light, like described above in relation to the prior art of FIG. 12A, techniques disclosed herein may be used to expand the slow-axis spatial distribution, reduce its divergence, and improve its delineation of a well-defined edge surface for an extended depth, even if they broaden the spatial distribution of pump light illumination on the flowing lasing gas, in accordance with some embodiments. That edge surface of the pump beam then may serve as the choice for the edge surface of the output beam, which, together with amplifier edges accomplished by the optical windows (or gas curtains flowing along the optical windows), then may determine the size and shape of the amplifier region, in accordance with some embodiments. In turn, this may determine the size and shape of the perimeter of the output coupling optic, in accordance with some embodiments.

In accordance with some embodiments, techniques disclosed herein may be utilized to provide a highly desirable configuration for pumping a DPAL with a uniform intensity. As will be appreciated in light of this disclosure, efficient pumping of a DPAL may involve illumination intensities of a few kilowatts per square centimeter, but typical diode stacks may produce closer to only 200 W/cm$^2$. Rather than overlapping pump beams from various angles to achieve, for instance, a ten-fold increase in intensity, techniques disclosed herein may utilize optical demagnification (e.g., approximately ten-fold) along the fast-axis, optionally with a beam-combining element that may allow tiling the amplifier surface with a tessellated pump beam that is still collimated along the fast axis, in accordance with some embodiments. By (optionally) choosing the edges of this beam along the fast axis to lie along the flow direction, the pump beam edge surface may be shared by the output beam edge, in accordance with some embodiments. By largely preserving the fast-axis collimation, the amplifier region may be pumped from both sides without the two pump arrays jeopardizing one another, so long as a small angle is introduced between the impinging beam axes, in accordance with some embodiments. By using two-sided pumping, the magnification of each pump beam may be reduced (e.g., by half, such that there is a five-fold concentration rather than ten-fold), in accordance with some embodiments. The slow-axis direction then may be defined, in accordance with some embodiments, by using an optical method to create an image within the amplifier or by using side mirrors to contain the slow-axis light, either optionally being augmented by a flowing side window to assist in defining the side surfaces of the amplifier region. The depth of the amplifier region then may approach or exceed the transverse dimension, reaching an aspect ratio that approaches or exceeds unity, in accordance with some embodiments.

As will be appreciated in light of this disclosure, techniques disclosed herein may be used, in part or in whole, to improve any of a wide range of existing DPAL systems. For example, in accordance with some embodiments, techniques disclosed herein may be utilized in relation to a DPAL system like that described in U.S. Pat. No. 9,653,869, titled "Optical Surface Preservation Techniques and Apparatus," the disclosure of which is herein incorporated by reference in its entirety.

Longitudinally Pumped System Architecture and Operation

FIG. 1 illustrates a gaseous laser system 1000a configured for longitudinal pumping, in accordance with an embodiment of the present disclosure. As can be seen, system 1000a may include an unstable resonator 100 including a high-reflectivity mirror 110 and an output coupler 120, a lasing amplifier 130, and an optical window assembly 140. As can be seen further, system 1000a may include one or more pump beam sources 150, together with one or more beam-shaping optics 190 (for the fast and slow axes), and a pump beam edge-defining element 160 (e.g., such as a mirror, optical element, and/or mask assembly) for longitudinal pumping of lasing amplifier 130 via one or more pump beams 152 through a window assembly 140 (e.g., a forward end window 142 and/or a rearward end window 144) to illuminate the front and/or rear of a flowing lasing gas 170 (e.g., gain medium). In its operation, system 1000a may produce one or more output beams 10. Each of these elements is discussed in turn below.

Figure 2:
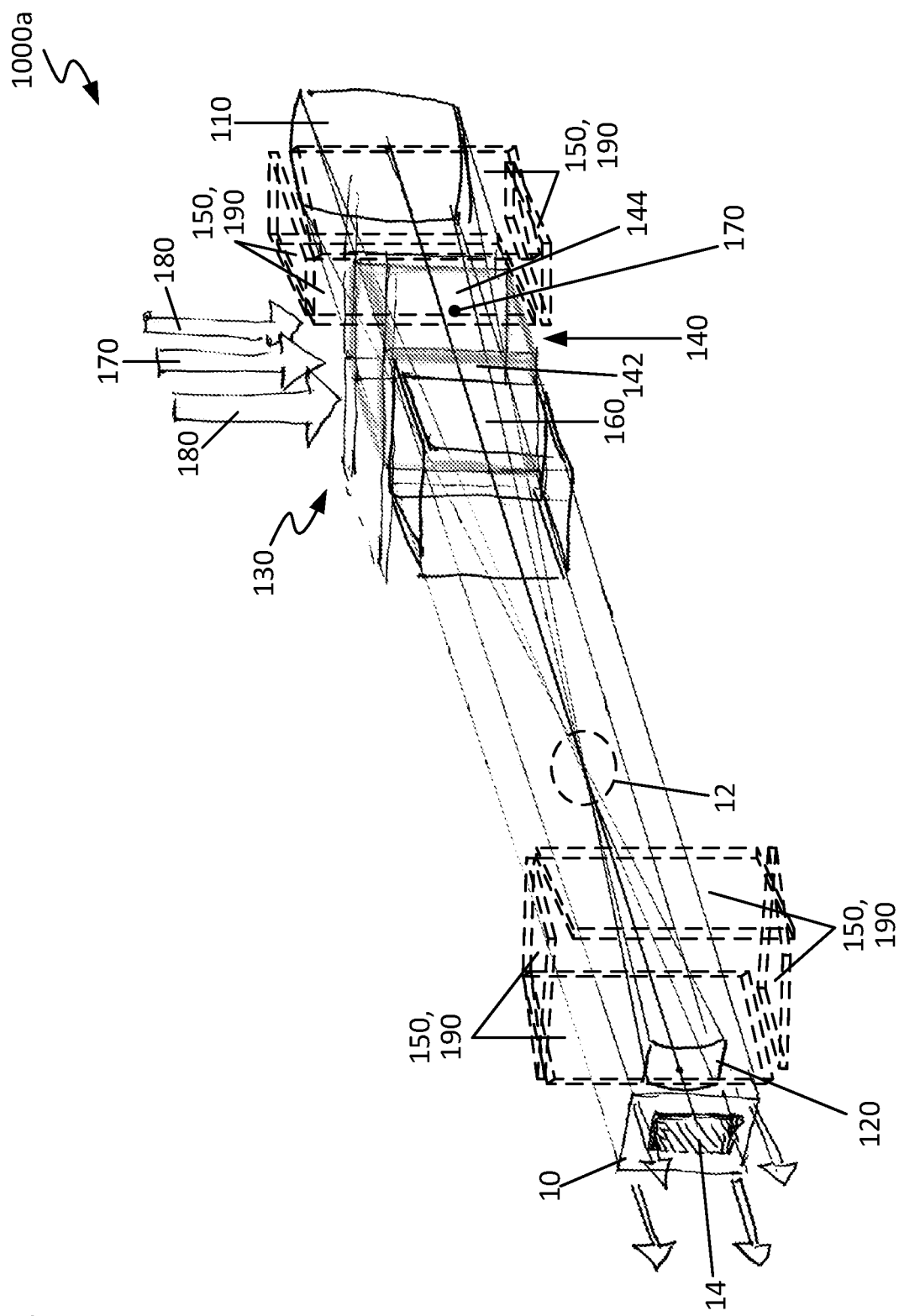
FIG. 2 illustrates a partial view of the system of FIG. 1, in accordance with an embodiment of the present disclosure.
Figure 3:
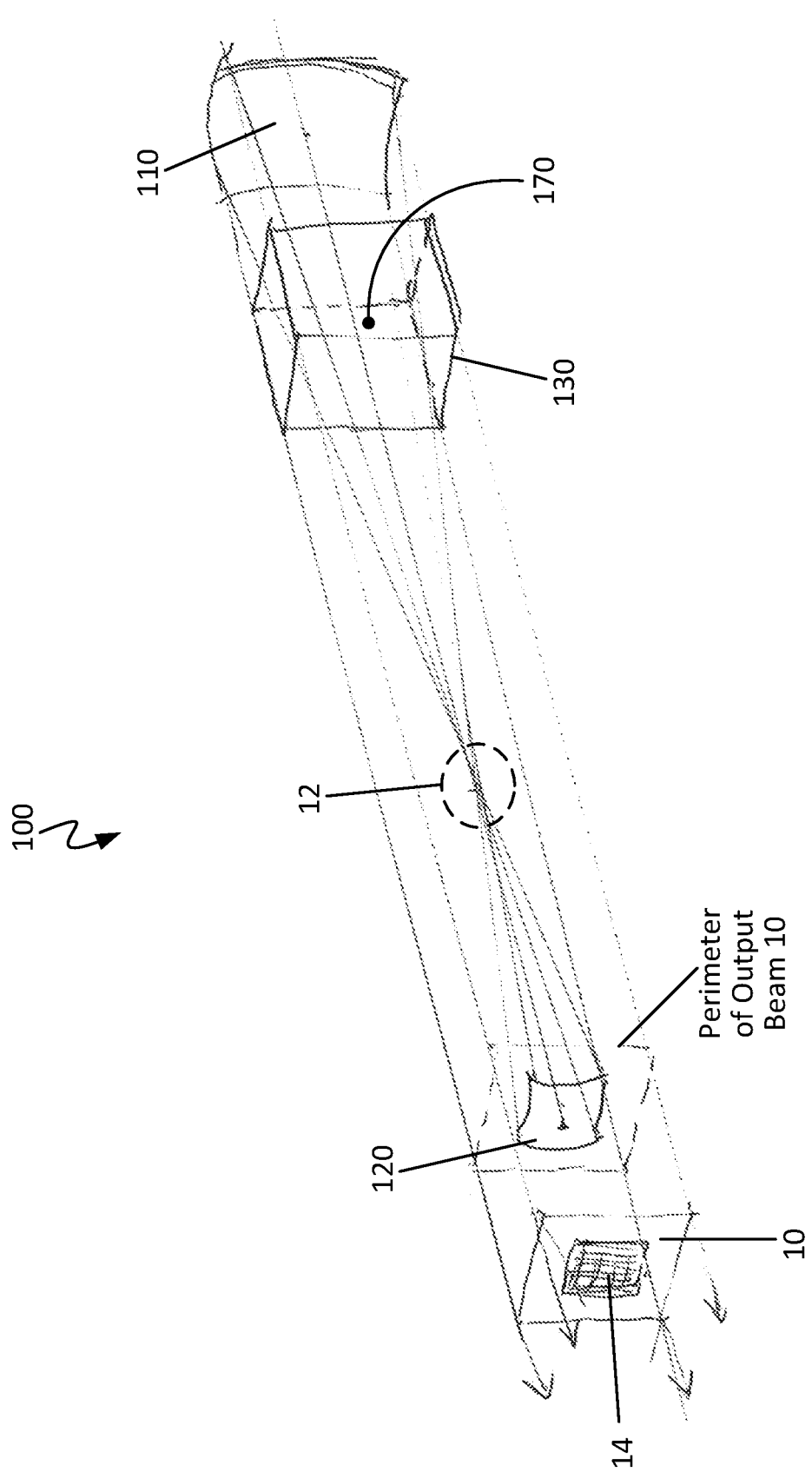
FIG. 3 illustrates another partial view of the system of FIG. 1, in accordance with an embodiment of the present disclosure.

As noted above, system 1000a may include an unstable resonator 100 and a lasing amplifier 130. FIG. 2 illustrates a partial view of system 1000a, in accordance with an embodiment of the present disclosure. In some embodiments, unstable resonator 100 may be configured, for example, as a confocal unstable resonator. In some cases, unstable resonator 100 may be configured as a negative branch confocal unstable resonator or a positive branch confocal unstable resonator. Other suitable configurations for unstable resonator 100 will depend on a given target application or end-use and will be apparent in light of this disclosure.

Regarding high-reflectivity mirror 110 (of unstable resonator 100), the geometry and dimensions, as well as the reflectivity, thereof may be customized, as desired for a given target application or end-use. In some cases, mirror 110 may have a substantially spherical or parabolic geometry. In some cases, mirror 110 may have a reflectivity, for example, in the range of about 95.0-99.9999% (e.g., about 95.0-97.0%, about 97.0-99.0%, about 99.0-99.9999%, about 99.95-99.9999%, or any other sub-range in the range of about 95.0-99.9999%). In at least some cases, mirror 110 may include and optionally extend beyond the illumination pattern provided by any reflective region of output coupler 120, multiplied by the magnification of unstable resonator 100. Other suitable configurations for high-reflectivity mirror 110 will depend on a given target application or end-use and will be apparent in light of this disclosure.

Regarding output coupler 120 (of unstable resonator 100), the geometry and dimensions, as well as the reflectivity, thereof also may be customized, as desired for a given target application or end-use. In some embodiments, output coupler 120 may include, for example, (1) an inner region including an output coupling mirror with at least some reflectivity and (2) an outer region (e.g., its perimeter) that maximizes transmission. In some such cases, the output coupling mirror (of output coupler 120) may have a substantially spherical or parabolic geometry. In some cases, the output coupling mirror (of output coupler 120) may have a reflectivity, for example, in the range of about 50.0-99.9999% (e.g., about 50.0-70.0%, about 70.0-90.0%, about 90.0-99.0%, about 99.0-99.9999%, or any other sub-range in the range of about 50.0-99.9999%). In some instances, it may be desirable to have a reflectivity that transitions smoothly from high reflectivity to high transmission. In some instances, it may be desirable to ensure that output coupler 120 has a well-defined edge. As will be appreciated in light of this disclosure, comparing (A) the full width at half maximum (FWHM) (i.e., the distance from one side to the other where the intensity drops to half of its central intensity) and (B) the full width at one-tenth maximum (FWTM) (i.e., which quantifies the distance between the two side where the intensity has dropped to one-tenth its central value) may provide a measure of the edge thickness. For a one-dimensional Gaussian distribution, the FWTM is 83% greater than the FWHM. For a distribution whose intensity distribution is made more uniform than a Gaussian and whose edges are better defined than that of a Gaussian, the FWTM is closer in value to the FWHM. Rather than the FWTM being 83% greater than the FWHM, it may be only 20% greater or even within 0.001-10.0% of the FWHM. The closer the FWTM distance is to the FWHM distance, the sharper the edge definition.

Figure 4A:
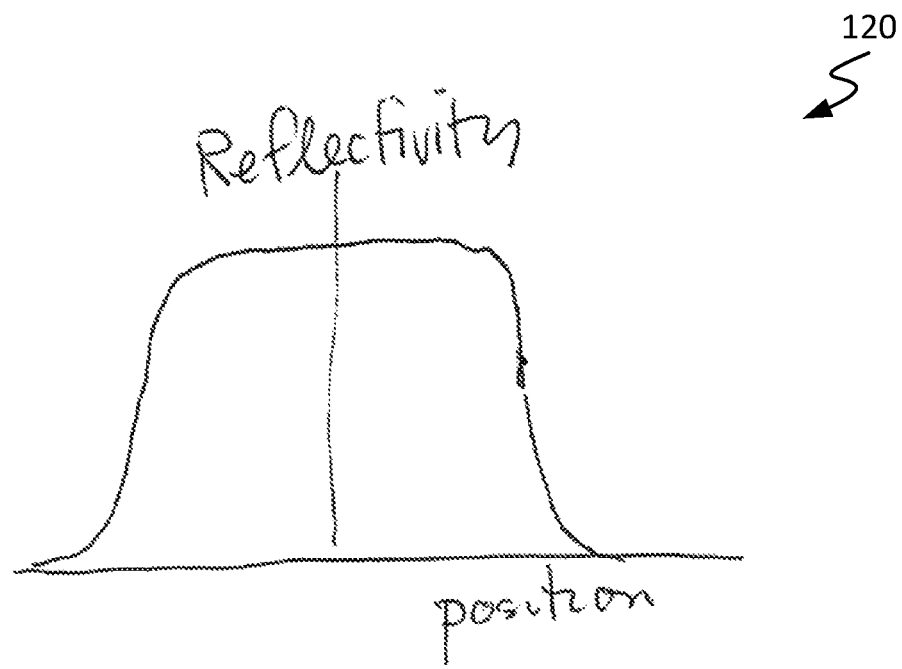
FIG. 4A is a graph illustrating reflectivity as a function of position for an output coupler configured with graded reflectivity, in accordance with an embodiment of the present disclosure.
Figure 4B:
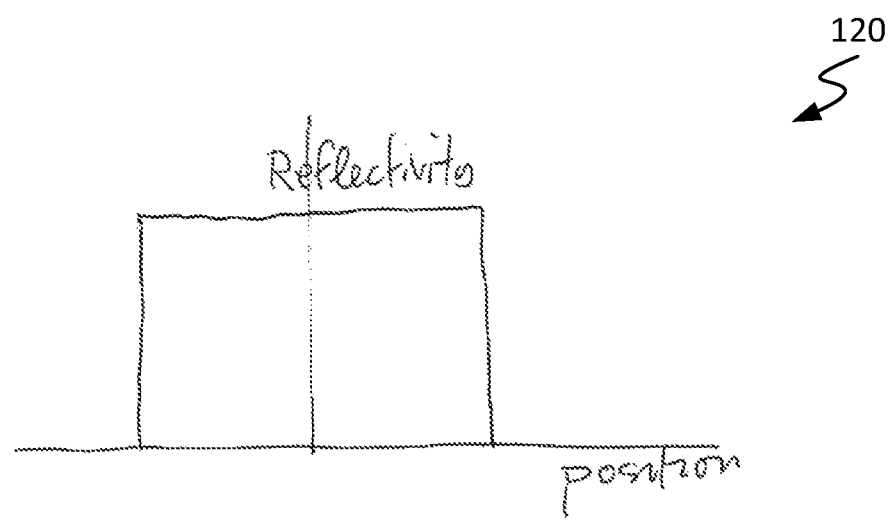
FIG. 4B is a graph illustrating reflectivity as a function of position for an output coupler configured with uniform reflectivity, in accordance with an embodiment of the present disclosure.

Further regarding the reflectivity of output coupler 120, FIG. 4A is a graph illustrating reflectivity as a function of position for an output coupler 120 configured with graded reflectivity, in accordance with an embodiment of the present disclosure, and FIG. 4B is a graph illustrating reflectivity as a function of position for an output coupler 120 configured with uniform reflectivity out to a well-defined edge, in accordance with an embodiment of the present disclosure. As will be appreciated in light of this disclosure, the example reflectivity profiles shown in FIGS. 4A-4B may be interpreted (A) as being across the diameter of an output coupler 120 configured as an axially symmetric mirror with a circular perimeter or (B) as a function of two orthogonal axes of an output coupler 120 with a rectangular or square perimeter. If output coupler 120 has a graded reflectivity, for example, then output beam 10 leaving mirror 110 and passing through flowing lasing gas 170 (discussed below) may have a generally diffuse edge, in accordance with some embodiments. If output coupler 120 instead has a uniform reflectivity out to a well-defined edge, for example, then output beam 10 leaving mirror 110 and passing through flowing lasing gas 170 still may have a diffuse edge, but only if the gain of flowing lasing gas 170 tapers to zero, in accordance with some embodiments. If, for example, output coupler 120 has a uniform reflectivity and flowing lasing gas 10 has uniform gain due to being pumped with pump beam(s) 152 having a distinct edge co-located at the edge of output beam 10, then output beam 10 leaving mirror 110 and passing through flowing lasing gas 170 may have a distinct edge, in accordance with some embodiments. Other suitable configurations for output coupler 120 will depend on a given target application or end-use and will be apparent in light of this disclosure.

In accordance with some embodiments, lasing amplifier 130 may include a window assembly 140 in which a flowing lasing gas 170 may be provided. Lasing amplifier 130 further may be configured, in accordance with some embodiments, to have one or more flowing gas curtains 180 flowing along interior surface(s) of window assembly 140. Each of these elements is discussed in turn below.

Window assembly 140 may include one or more optical windows. The quantity and arrangement of optical windows, as well as the geometry and dimensions of each such optical window, may be customized, as desired for a given target application or end-use. As can be seen from FIG. 1, for example, window assembly 140 may include two optical windows—a forward end window 142 (generally closer to output coupler 120) and a rearward end window 144 (generally closer to mirror 110). It should be noted, however, that the present disclosure is not intended to be so limited, as window assembly 140 may include a lesser quantity (e.g., only one, such that mirror 110 is included within the volume of the flowing gases) or greater quantity (e.g., 3, 4, 5, 6, 7, 8, or more) of optical windows, in accordance with other embodiments. For example, as can be seen from FIG. 11 (discussed below), for example, window assembly 140 may include four optical windows—windows 142, 144 (discussed above), a first side window 146, and a second side window 148.

Additionally, the material composition, optical transmission characteristics, and refraction of a given optical window 142, 144, 146, 148 (or window assembly 140 more generally) may be customized, as desired for a given target application or end-use, and generally may depend on performance characteristics and requirements such as resilience to degradation, absorption of energy from pump beam 152 and output beam 10, and dimensional changes associated with energy absorption, among others. In some embodiments, a given optical window may be constructed from fused silica or sapphire, for example. In some embodiments, a given optical window may be (A) coated with one or more coating layers, such as a high-transmission coating or a high-reflectivity coating and/or (B) etched or embossed with a nanotextured surface. In accordance with some embodiments, one or more windows may be customized or contoured to provide (A) optical refraction, such as spherical or cylindrical lensing and/or (B) deflection (as through a prism), either of which may be segmented to various regions of the window or encompassing the whole window. Other suitable configurations for window assembly 140, in part or in whole, will depend on a given target application or end-use and will be apparent in light of this disclosure.

As previously noted, flowing lasing gas 170 may be provided in lasing amplifier 130. More specifically, a gaseous amplifier gain medium may be utilized as flowing lasing gas 170, in accordance with some embodiments. The chemical composition, pressure, and vapor concentration of flowing lasing gas 170 may be customized, as desired for a given target application or end-use. In accordance with some embodiments, flowing lasing gas 170 may be (or otherwise may include) any one (or combination) of helium-4, helium-3, a hydrocarbon, and a fluorocarbon, to name a few options. In accordance with some embodiments, flowing lasing gas 170 may be substantially free of complex molecules (e.g., such as hydrocarbons or fluorocarbons), relying on, for example, helium as a quenching agent. In accordance with some other embodiments, one or more complex molecules may be included as quenching agent(s). In at least some hydrocarbon-free cases, the gas pressure may be maintained, for example, in the range of about 300-20,000 torr (e.g., about 500-10,000 torr or any other sub-range in the range of about 300-20,000 torr). In at least some cases that incorporate a quenching agent, the gas pressure may be maintained, for example, in the range of about 50-1,500 torr (e.g., about 200-800 torr or any other sub-range in the range of about 50-1,500 torr). In accordance with some embodiments, flowing lasing gas 170 may include the vapor of one or more alkali metals, such as rubidium (Rb), cesium (Cs), and/or potassium (K), to name a few. In accordance with some embodiments, flowing lasing gas 170 may have an alkali metal vapor concentration in the range of about $5\times10^{11}$ to $5\times10^{14}$ atoms/cm$^3$ (e.g., about $5\times10^{11}$ to $5\times10^{12}$ atoms/cm$^3$, about $5\times10^{12}$ to $5\times10^{13}$ atom s/cm$^3$, about $5\times10^{13}$ to $5\times10^{14}$ atoms/cm$^3$, or any other sub-range in the range of about $5\times10^{11}$ to $5\times10^{11}$ atom s/cm$^3$). As will be appreciated in light of this disclosure, scenarios with lower gas pressure and/or higher output power generally may operate with lower alkali density, whereas others with higher pressure and/or lower output power (e.g., some cases involving helium as a quenching agent) may operate with higher alkali density, in accordance with some embodiments.

Additionally, the flow rate and flow direction of flowing lasing gas 170 may be customized, as desired for a given target application or end-use. In accordance with some embodiments, flowing lasing gas 170 may have a flow rate through window assembly 140 (or lasing amplifier 130 more generally) in the range of about 1-100 m/s (e.g., about 10-25 m/s, about 25-50 m/s, or any other sub-range in the range of about 1-10 m/s). Flowing lasing gas 170 may flow generally upward (e.g., generally against the direction of gravity), generally downward (e.g., generally in the direction of gravity), or transversely in any direction relative to gravity. Other suitable characteristics for flowing lasing gas 170 will depend on a given target application or end-use and will be apparent in light of this disclosure.

Also, as previously noted, one or more flowing gas curtains 180 may be provided along interior surface(s) of window assembly 140. For example, in accordance with some embodiments, a single flowing gas curtain 180 may be provided. In accordance with some other embodiments, an inner flowing gas curtain 180a and an outer flowing gas curtain 180b may be provided. A given flowing gas curtain 180 may include a flow of one or more gas(es) that do not include a substantial concentration of alkali vapor and may be provided over a given optical window through which (A) a given pump beam 152 and/or (B) output beam 10 passes in operation of system 1000a, in accordance with some embodiments.

The chemical composition and concentration of a given flowing gas curtain 180 may be customized, as desired for a given target application or end-use. In accordance with some embodiments, flowing gas curtain(s) 180a, 180b may be of the same composition and pressure as flowing lasing gas 170 but be substantially depleted of alkali vapor, such that flowing gas curtain(s) 180a, 180b may have a concentration of alkali vapor which is reduced by a factor in the range of about 3-500 (e.g., about 5-50, about 10-20, or any other sub-range in the range of about 3-500). Because there may be some mixing of gas(es) between the separate flow channels allowing some concentration to pass from the channel with flowing lasing gas 170 into the channel with the flowing gas curtain(s) 180a, 180b, one or more additional flowing gas curtains 180 optionally may be provided to achieve further reduction in the alkali concentration, in accordance with some embodiments.

Additionally, the flow velocity of a given flowing gas curtain 180 may be customized, as desired for a given target application or end-use. In accordance with some embodiments, a given flowing gas curtain 180 may have a flow velocity along a given window of window assembly 140 (or lasing amplifier 130 more generally) that approximates the velocity of flowing lasing gas 170. In some embodiments, a given flowing gas curtain 180 may have a velocity that differs from that of flowing lasing gas 170, for example, by flowing in generally the same direction at a speed that differs from that of flowing lasing gas 170 by about 0.1-30% (e.g., about 0.1-10%, about 10-30%, or any other sub-range in the range of about 0.1-30%). In some cases, the difference may be a reduction of the flow speed of flowing gas curtain 180 by about 10%, for instance, to minimize (or otherwise reduce) any eddy currents.

Also, the temperature of a given flowing gas curtain 180 may be customized, as desired for a given target application or end-use. In accordance with some embodiments, a given flowing gas curtain 180 may have a temperature that is less than the temperature of flowing lasing gas 170 by about 10-60° C. (e.g., about 10-20° C., about 20-30° C., about 30-60° C., or any other sub-range in the range of about 10-60° C.). By maintaining a lower temperature, the equilibrium concentration of alkali vapor in flowing gas curtain 180 may be reduced from that of flowing lasing gas 170. The temperature difference between flowing lasing gas 170 and an inner flowing gas curtain 180*a*, for example, may be limited because material surface(s) between the flow of flowing lasing gas 170 and any inner flowing gas curtain 180*a* may reach an equilibrium temperature that is below the condensation temperature of the alkali in flowing lasing gas 170, thereby altering the properties of flowing lasing gas 170. Adding a second, outer flowing gas curtain 180*b* may relax this concern, as outer flowing gas curtain 180*b* may be maintained at a temperature that is much lower than either that of flowing lasing gas 170 or inner flowing gas curtain 180*a*, substantially reducing the alkali concentration adjacent to a given window without altering the properties of flowing lasing gas 170. Other suitable characteristics for flowing gas curtain(s) 180 will depend on a given target application or end-use and will be apparent in light of this disclosure.

Figure 5:
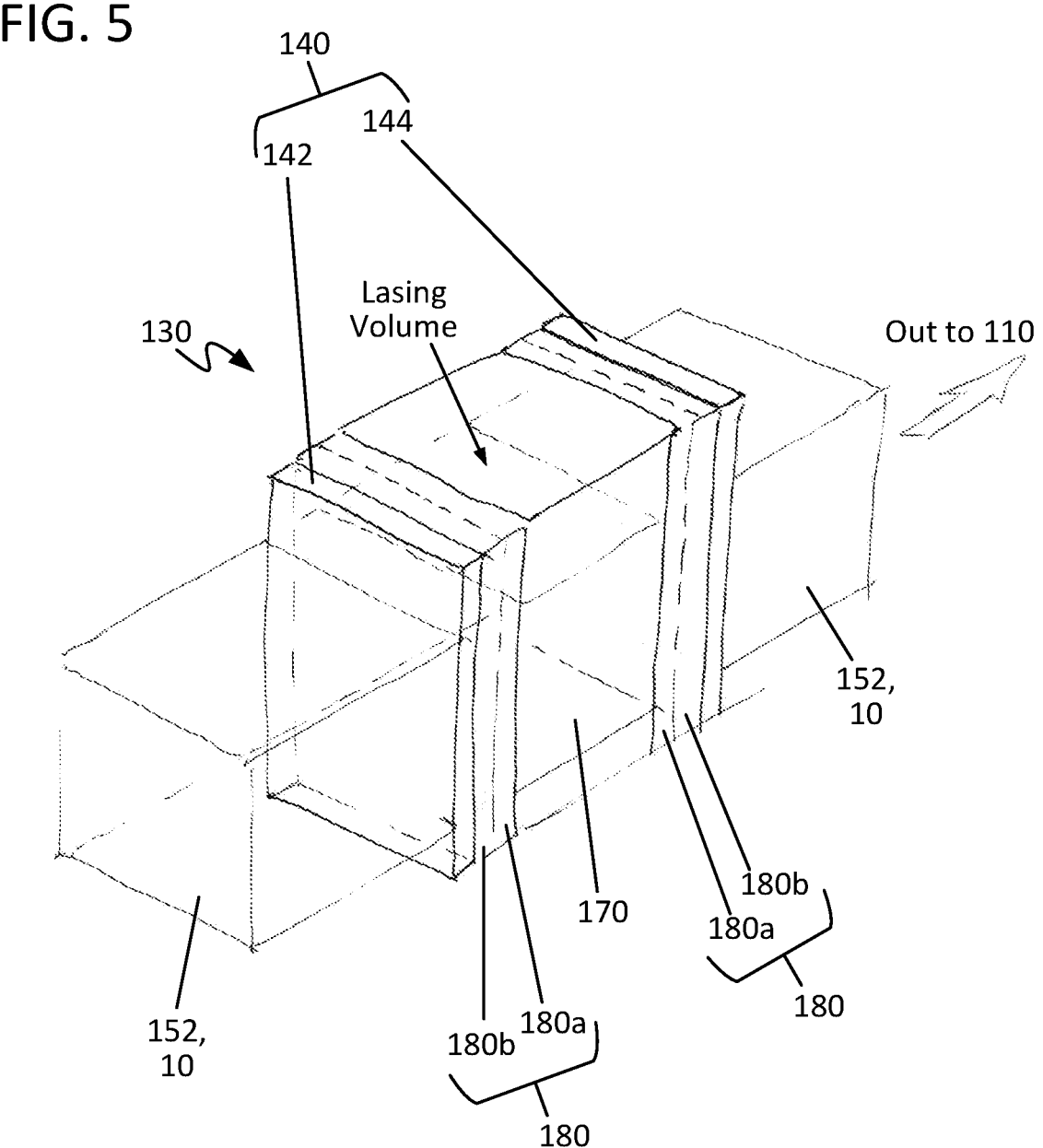
FIG. 5 illustrates another partial view of the system of FIG. 1, in accordance with an embodiment of the present disclosure.

The overall configuration of lasing amplifier 130 and arrangement of flowing gas curtain(s) 180 and flowing lasing gas 170 with respect to window assembly 140 may be customized, as desired for a given target application or end-use. In so doing, the bounds of flowing lasing gas 170 and flowing gas curtain(s) 180 may be defined, at least in part. For example, consider FIG. 5, which illustrates a partial view of system 1000*a* of FIG. 1, in accordance with an embodiment of the present disclosure. As can be seen here, forward end window 142 and rearward end window 144 may be of substantially rectangular (e.g., square) geometry and arranged substantially parallel to one another. Flowing lasing gas 170 may flow through lasing amplifier 130 between windows 142, 144. A flowing gas curtain 180 may be provided between the flow of flowing lasing gas 170 and forward end window 142. Similarly, a flowing gas curtain 180 may be provided between the flow of flowing lasing gas 170 and rearward end window 144. In at least some cases including both an inner flowing gas curtain 180*a* and an outer flowing gas curtain 180*b*, inner flowing gas curtain 180*a* may flow between the flow of flowing lasing gas 170 and outer flowing gas curtain 180*b*, while outer flowing gas curtain 180*b* may flow between inner flowing gas curtain 180*a* and the adjacent window surface. In the example configuration of FIG. 5, window assembly 140, flowing gas curtains 180 (e.g., inner flowing gas curtain 180*a* and outer flowing gas curtain 180*b*), and the lasing volume of flowing lasing gas 170 may exhibit a generally cubic shape. It should be noted, however, that the present disclosure is not intended to be so limited, as in a more general sense, and in accordance with some other embodiments, a rectangular box shape or other parallelepiped shape may be provided.

In some other embodiments, forward end window 142 and rearward end window 144 may be of substantially octagonal geometry and arranged substantially parallel to one another. Flowing lasing gas 170 may flow through lasing amplifier 130 between windows 142, 144. A flowing gas curtain 180 may be provided over the interior of forward end window 142 and rearward end window 144. In these example embodiments, window assembly 140, flowing gas curtain(s) 180, and the lasing volume of flowing lasing gas 170 may exhibit a generally right octagonal prism shape. It should be noted, however, that the present disclosure is not intended to be so limited, as in a more general sense, and in accordance with some other embodiments, a right hexagonal prism shape, a right decahedral prism shape, or other polyhedral prism shape may be provided. Note that, for unstable resonators 100 with negative magnification, the illumination pattern is inverted with each pass, so that the goal of providing edge surfaces that are congruent for pump beam(s) 152 and output beam(s) 10 may be achieved with a prism shape, for example, only if it has an even number of sides. For unstable resonators 100 with positive magnification, the shape may not be so limited.

In some other embodiments, forward end window 142 and rearward end window 144 may be of substantially circular geometry and arranged substantially parallel to one another. Flowing lasing gas 170 may flow through lasing amplifier 130 between windows 142, 144. A flowing gas curtain 180 may be provided between flowing lasing gas 170 and the interior surface of forward end window 142 and/or rearward end window 144. In these example embodiments, window assembly 140, flowing gas curtain(s) 180, and the lasing volume of flowing lasing gas 170 may exhibit a generally right circular cylinder shape. It should be noted, however, that the present disclosure is not intended to be so limited, as in a more general sense, and in accordance with some other embodiments, a right elliptical prism shape or other closed-curve prism shape may be provided.

As previously noted, system 1000*a* may include one or more pump beam sources 150 configured to provide optical pumping for system 1000*a* by delivering one or more pump beams 152 to flowing lasing gas 170 in lasing amplifier 130. In accordance with some embodiments, a given pump beam source 150 may be configured to provide pump light which is highly collimated along one axis (e.g., the fast axis) but divergent along another axis (e.g., the slow axis). As will be appreciated in light of this disclosure, the optical pumping wavelength(s) and spectral linewidth(s), as well as the beam geometry, of the pump light may be customized, as desired for a given target application or end-use. As will be further appreciated, in some cases, the pump beam 152 intensity emanating from a given pump beam source 150, on its own, may not be sufficient for optimally pumping system 1000*a*. Thus, in accordance with some embodiments, a given pump beams 152 from multiple pump beam sources 150 may be merged with (e.g., aligned along an adjacent trajectory) or overlapped with one another.

Figure 6:
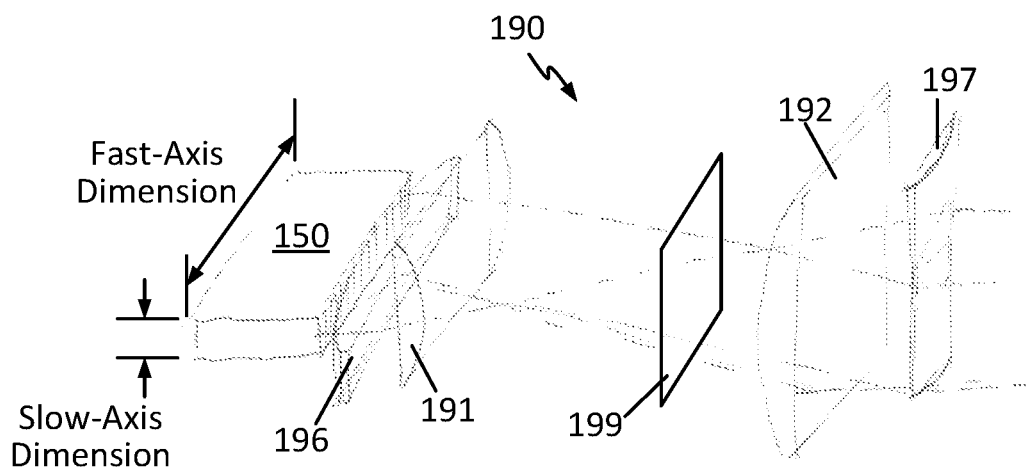
FIG. 6 illustrates an example arrangement of pump beam source(s) and beam-shaping optic(s), in accordance with an embodiment of the present disclosure.

The overall three-dimensional profile of pump beam 152, as well as its average intensity, spatial illumination pattern, and divergences, may be customized by placement of pump source 150 components together with one or more beam-shaping optics 190 (e.g., refractive and/or reflective elements) along the optical path that modify the envelope of pump beam 152 as it propagates from pump source 150 to the region of flowing lasing gas 170. For example, consider FIG. 6, which illustrates an example arrangement of pump beam source(s) 150 and beam-shaping optics 190, in accordance with an embodiment of the present disclosure. Beam-shaping optics 190 may be configured, in accordance with some embodiments, to customize the profile of pump beam(s) 152 impinging on flowing lasing gas 170. As can be seen, pump beam source 150 may include a stack of laser diode array bars with a slow-axis dimension and a fast-axis dimension. Due to the large divergence of pump beam 152 in the slow-axis direction, beam-shaping optics 190 (e.g., such as cylindrical lenses 191, 192, 196, 197 and/or curved mirrors) configured, in accordance with some embodiments, to magnify pump beam 152 along the slow-axis dimension may provide a divergence reduction, resulting in slow-axis divergence that more closely matches that of the fast axis, allowing greater collimation as pump beam 152 propagates a greater depth through flowing lasing gas 170. Due to the low divergence of the fast axis, beam-shaping optic(s) (e.g., such as cylindrical lenses 191, 192, 196, 197 and/or curved mirrors) that serve to de-magnify (e.g., concentrate) pump beam 152 along this direction generally may provide a divergence that more closely matches that of the slow axis. As will be appreciated in light of this disclosure, although this constitutes an increase in the fast-axis divergence, it generally will not become the limiting factor in the goal of aligning with or defining amplifier surfaces that are shared with output beam(s) 10.

For some embodiments, a striped illumination pattern (attributable to the alternation of diode array sources and dark regions due to their heatsinks) may be present in flowing lasing gas 170. To eliminate (or otherwise reduce) this non-uniformity, a diffuser 199 may be added to the optical arrangement to address (e.g., smear out) these variations, in accordance with some embodiments. In some cases, diffuser 199 may be, for example, a small-angled, engineered diffuser.

For some embodiments, achieving a three-dimensional profile whose largest divergence (e.g., that of the slow axis) is minimized may be aided by incorporating a pump beam source 150 that has a large mismatch in its height-to-width ratio (e.g., with its large dimension along the fast axis (many bars aligned in one or more stacks) and its small dimension along the slow axis (few bars or a single bar in width). In some embodiments, the physical size of pump beam source 150 along the fast-axis direction may exceed the width of pump beam source 150 along the slow-axis direction, for instance, by a factor in the range of two to twenty.

Figure 7:
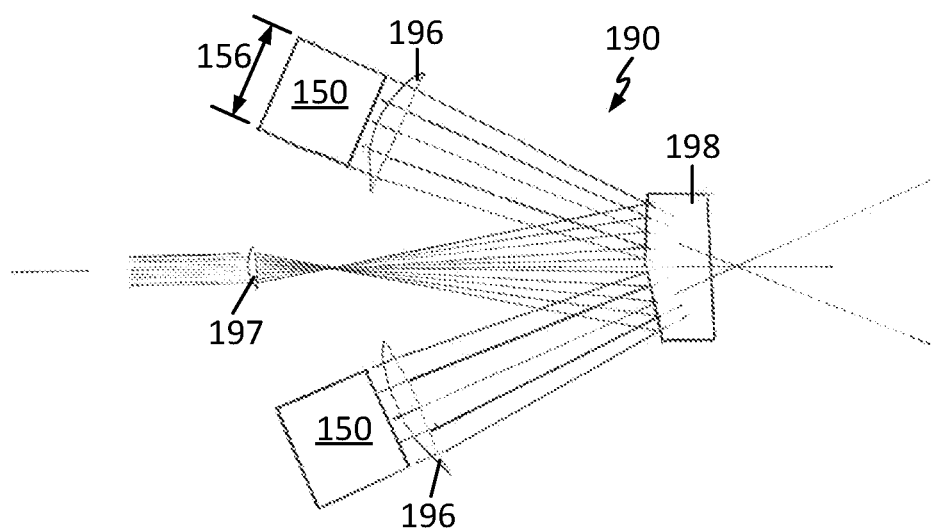
FIG. 7 illustrates an example arrangement of pump beam source(s) and beam-combining optic(s), in accordance with an embodiment of the present disclosure.

In some cases, the competing desires for de-magnifying (e.g., concentrating) the illumination along the fast axis while still filling the desired illumination pattern may require a pump beam source 150 whose size along the fast-axis direction (e.g., the number of bars in the stack) exceeds recommended limits in the manufacturing process, exceeds space available along a single direction in system 1000a, or causes optical elements to become large. Thus, and in accordance with some embodiments, one or more beam-combining elements may be employed. For instance, consider FIG. 7, which illustrates an example arrangement of pump beam source(s) 150 and beam-combining optic(s) 198, in accordance with an embodiment of the present disclosure. In some such cases, pump beam source 150 may be segmented into a quantity of contributing pump beam source 150 elements, each with its angled facet on beam-combining optic(s) 198, so that the desired but unattainable height is equal to the sum of the stack heights. In some embodiments, each pump beam source 150 may have its own transport optics and its own region of flowing lasing gas 170 to which its pump beam 152 illumination is dedicated. In some such embodiments, pump beams 152 may be formed separately but directed along an appropriate path so that the illuminated region from one contribution is made to be adjacent to that of a neighboring contribution. As will be apparent in light of this disclosure, the quantity of pump beam sources 150 that may be combined by beam-combining optic(s) 198 may be customized, as desired for a given target application or end-use. For instance, in some cases, two to fifty (or more) may be so combined.

In some cases, the length of the optical transport path may exceed the desired dimension, due to one or more factors (e.g., the optical arrangement required for magnifying the slow axis, for de-magnifying in the fast axis, for minimizing the angle of incidence into a longitudinally pumped amplifier, etc.). In such cases, the optical path may be folded by reflecting the path using a turning mirror, in accordance with some embodiments. In some instances, it may be desirable to have a portion of pump beam 152 encounter some optical element(s) while another portion thereof encounters different optical element(s). In some instances, one portion of pump beam 152 may be folded in a manner that differs from another portion. In some instances, there may be pump beam sources 150 emanating from different path(s) that are then used in combination to illuminate a region of flowing lasing gas 170. In these cases, pump beams 152 may be combined, for example, on a multifaceted mirror assembly, in accordance with some embodiments.

In some embodiments, pump beam 152 may illuminate flowing lasing gas 170 longitudinally (e.g., through one or more windows that are also shared by output beam 10). For such embodiments, it may be desirable to illuminate flowing lasing gas 170 via one or more pump beams 152 oriented at an angle relative to output beam 10. If this angle can be chosen to be small and the divergence can be minimized, then the depth of the illuminated region of flowing lasing gas 170 can be greater. Furthermore, if the angle between the optical axis of pump beam 152 and output beam 10 is also chosen to lie along the slow axis of pump beam 152, then the depth of the illuminated region of flowing lasing gas 170 will be determined by the greater of these, and the fast axis of the pump array can be used to delineate a boundary that is shared by pump beam 152 and output beam 10. In some embodiments, the surface of the region of flowing lasing gas 170 defined by the edge of fast-axis illumination is substantially perpendicular to the flow of flowing lasing gas 170, at the inlet of flowing lasing gas 170 into the amplifier region, and at the exit of flowing lasing gas 170 leaving the amplifier region. Then, assuming a rectilinear amplifier region, the edge of the illuminated region of flowing lasing gas 170 along the slow axis will follow flow streamlines.

In some embodiments, the angle of pump beam 152 entering flowing lasing gas 170 along the slow axis, together with the divergence along the slow axis, may be insufficient to provide a well-defined edge surface throughout the amplifier volume. In these instances, the parameters of the slow-axis afocal telescope may be chosen to maximize the overlap between the volume of flowing lasing gas 170 illuminated by pump beam 152 and that illuminated by output beam 10.

Figure 8:
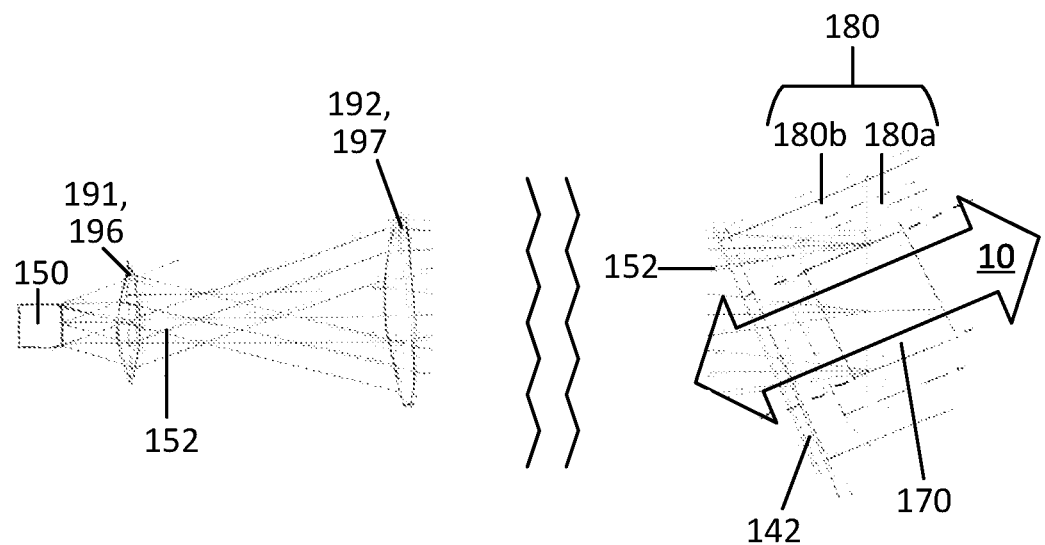
FIG. 8 illustrates an example longitudinal pumping arrangement, in accordance with an embodiment of the present disclosure.

This may be accomplished, for example, by selecting a width of pump beam 152 at the focus and a depth into flowing lasing gas 170 where that focus is positioned. Furthermore, to maximize the illumination at some depth into flowing lasing gas 170 of an off-axis pump beam 152 with a significant divergence, it may be useful to introduce a flowing side curtain to allow pump beam 152 transport to the region of flowing lasing gas 170 without exciting portions of flowing lasing gas 170 that are not illuminated by output beam 10. For example, consider FIG. 8, which illustrates an example longitudinal pumping arrangement, in accordance with an embodiment of the present disclosure. As can be seen here, pump beam source(s) 150 may impinge at an angle to illuminate flowing lasing gas 170. In some cases, as in FIG. 8, the focus of the slow-axis afocal telescope may lie at a depth roughly halfway within the amplifier volume, with a width chosen as the width of output beam 10 (which then becomes the width of the amplifier). Tracing the angled rays of pump beam 152 back to the entrance window(s) 142 and/or 144, it can be appreciated that some rays may pass through a side region of flowing gas curtain 180, entering flowing lasing gas 170 through the side rather than the front. These rays may contribute to forming a slow-axis focus at some depth within the amplifier volume of flowing lasing gas 170.

As will be appreciated in light of this disclosure, the illumination uniformity may be compromised in off-axis longitudinal pumping, most notably that two corners at the edge of pump beam 152 (or beyond its coverage) may have lower illumination intensity (or none at all). In some embodiments, flowing lasing gas 170 may be pumped from more than one side (e.g., two sides) of output beam 10 along the slow-axis direction, such that illumination from multiple pump beams 152 emanating from these multiple sides may share the same edge at the input of flowing lasing gas 170 and at the exit of flowing lasing gas 170 defined by the edge of the fast-axis illumination. In some embodiments, flowing lasing gas 170 may be pumped from multiple sides (e.g., four sides) of output beam 10, such that illumination from multiple pump beams 152 emanating from two of these multiple sides may share the same edge at the input of flowing lasing gas 170 and at the exit of flowing lasing gas 170 defined by the edge of the fast-axis illumination, and the other pump beams 152 may illuminate the active region up to that edge, as near as possible with the illumination along the direction of the slow-axis divergence. In some embodiments, flowing lasing gas 170 may be pumped along paths emanating from these multiple sides of output beam 10 through window 142 covering the amplifier end closest to output coupler 120. In some embodiments, flowing lasing gas 170 may be pumped along paths whose central axis is angled with respect to output beam 10 from multiple sides of output beam 10 through window 144 covering the amplifier end closest to high-reflectivity mirror 110.

Figure 9:
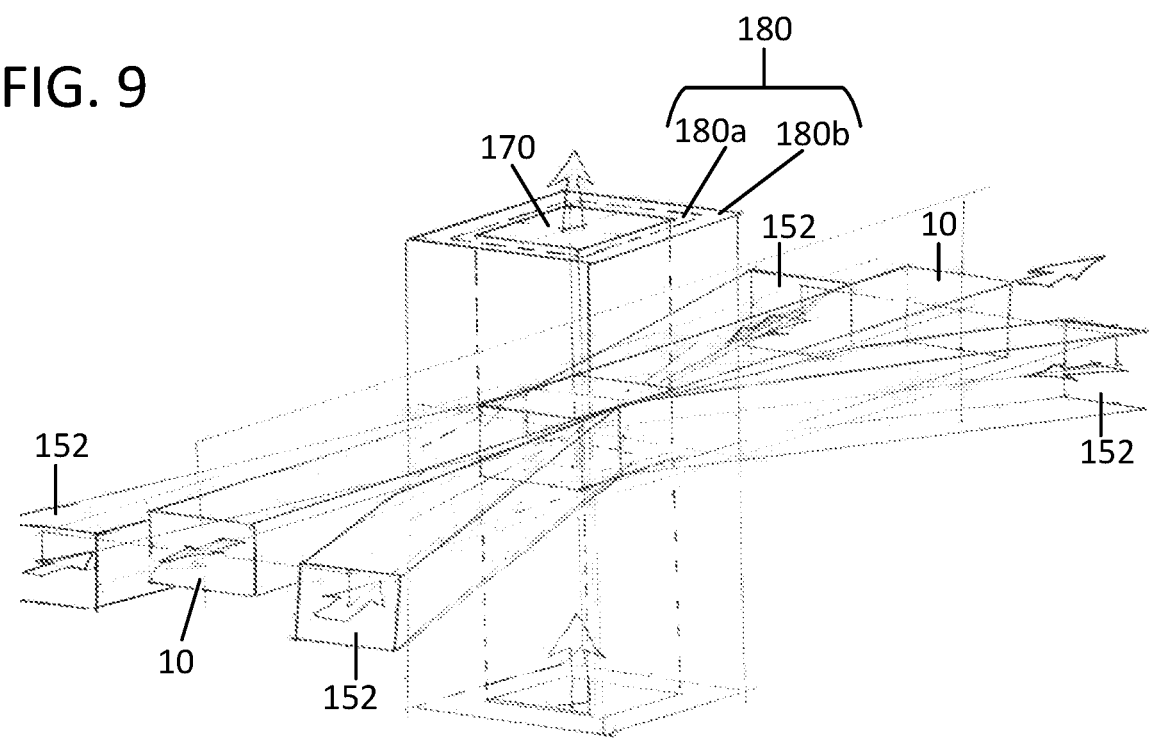
FIG. 9 illustrates an example longitudinal pumping arrangement, in accordance with an embodiment of the present disclosure.

In some embodiments, flowing lasing gas 170 may be pumped through both end window 142 (closest to output coupler 120) and end window 144 (closest to high-reflectivity mirror 110). As will be appreciated in light of this disclosure, it may be desirable to avoid alignment of two powerful pump beams sources 150 pointed directly at one another. In such cases, a perfect alignment of the fast-axis light from the two ends that define common edge surfaces that are shared by pump beam 152 and output beam 10 may cause the optical axes of the two opposing pump beams 152 to be shared, such that any pump light transmitted through flowing lasing gas 170 originating on one side may propagate into the laser on the other side. For these instances, an alternate alignment that provides for a small angle, for example, in the range of about 1-5° (e.g., about 2-4° or any other sub-range in the range of about 1-5°) between the optical plane of the fast-axis light entering from one end and the fast-axis light entering from the opposite end optionally may be employed, in accordance with some embodiments. For example, consider FIG. 9, which illustrates an example longitudinal pumping arrangement, in accordance with an embodiment of the present disclosure. As can be seen, this arrangement includes four pump beam sources 150 contributing to longitudinal pumping of a flowing lasing gas 170 with flowing gas curtain(s) 180 at both ends and on both sides, in accordance with some embodiments. After passing through flowing lasing gas 170, each of these transmitted beams 152 may follow a different optical path that is distinct from the incoming beam 152. It, therefore, can be made to propagate through the final fast-axis focusing element on the opposing side and arrive at the fast-axis focal plane, albeit at a different location in that focal plane due to the different angle in the flowing lasing gas 170. Where the transmitted beam 152 comes to a focus at a unique region of the focal plane in the opposing laser's optical path, it optionally may be deflected along a unique path for purposes of characterization, quantification, and/or absorption. In some such cases, the edge surface may become more complex, requiring additional care in assuring that unstable resonator 100 illuminates all pumped regions with output beam 10.

As previously noted, system 1000a also may include one or more pump beam edge-defining elements 160. Pump beam edge-defining element(s) 160 may be configured, in accordance with some embodiments, to help create (e.g., define and/or refine) a stronger edge for incident pump beam 152 light. In accordance with some embodiments, pump beam edge-defining element(s) 160 may include one or more mirrors, one or more optical elements, and/or one or more light-absorbing masks.

In some cases, the divergence of the slow axis may cause an illumination pattern which decreases with distance away from the fully illuminated region, such that the illumination intensity transitions past a level that may not be optimal for creating gain in this region of flowing lasing gas 170. In those instances, the design of the illumination pattern may face a choice of alternatives. That is, if the illumination pattern of unstable resonator 100 is chosen to not include the region that is insufficiently pumped, then that region may contribute to spontaneous emission near the edge of flowing lasing gas 170, causing inefficiencies in the adequately pumped regions due to amplified spontaneous emission (ASE). If instead the illumination pattern of unstable resonator 100 does include the region that is insufficiently pumped, then that illumination from the magnified pump beam 152 in unstable resonator 100 may not be optimally used. Thus, where pump beam 152 light can be deflected and employed for useful gain, one or more mirrors may be placed to define the edge of the illumination pattern at the location where pump beam 152 enters flowing lasing gas 170 to make a defining cut in the tail of the slow-axis light, deflecting rays impinging toward the low-illumination region back into the high-intensity region, in accordance with some embodiments. In some cases where slow-axis illumination extending outside the adequately illuminated region cannot be deflected and usefully used for gain, it may be simply absorbed on one or more light-absorbing masks outside the flowing lasing gas 170 region, so that its power does not contribute to internal heating and inefficiencies, in accordance with some embodiments. In either of these example scenarios, the definition of the pump beam 152 edge(s) may be improved, as the width of the edge in the amplifier region then will be defined by the width of the slow-axis divergence projected the distance into flowing lasing gas 170, growing by the product of the divergence times the distance as it propagates more deeply into flowing lasing gas 170, in accordance with some embodiments.

The quantity and arrangement of mirrors, optical elements, and/or masks of pump beam edge-defining element(s) 160 may be customized, as desired for a given target application or end-use. In some embodiments, pump beam edge-defining element(s) 160 may include two mirrors arranged to define two edges of the slow-axis illumination provided by pump beam 152. In some embodiments, pump beam edge-defining element(s) 160 may include four mirrors arranged in a box-like shape to define four edges of the illumination provided by pump beam 152. It should be noted, however, that the present disclosure is not intended to be so limited, as in accordance with other embodiments, pump beam edge-defining element(s) 160 may include fewer (e.g., 1, 2, or 3) or more (e.g., 5, 6, 7, 8, or more) mirrors, optical elements, and/or light-absorbing masks, as desired.

In accordance with some embodiments, pump beam edge-defining element(s) 160 may include a mirror assembly disposed near an intersection of pump beam 152 and the optical pathway of unstable resonator 100 and configured to have pump beam 152 incident therewith. In some cases, the mirror assembly may be configured to reflect at least a portion of pump beam 152 so as to define the edge of pump light incident therewith.

In accordance with some embodiments, pump beam edge-defining element(s) 160 may include an assembly of optical elements (e.g., lenses, mirrors, etc.) disposed outside of the optical pathway of unstable resonator 100 and configured to have pump beam 152 pass therethrough. In some instances, the assembly of optical elements may be configured to refractively optically transport and/or reflectively optically transport at least a portion of pump beam 152 so as to define the edge of pump light incident therewith. In some cases, the assembly of optical elements may be configured to form an image of at least a portion of pump beam 152 so as to define the edge of pump light incident therewith.

In accordance with some embodiments, pump beam 152 may enter the region of flowing lasing gas 170 axially, along the same optical path as output beam 10, by being deflected into flowing lasing gas 170 by an element that is transparent to output beam 10. In some cases, that element may reflect pump beam 152 and transmit output beam 10 due to a difference in (A) the direction of their linear polarization and/or (B) wavelength. By these and other methods, pump beam 152 and output beam 10 may achieve greater alignment for the goal of sharing edge surfaces that define the boundaries of the amplifier volume, in accordance with some embodiments.

As previously noted, system 1000a may be configured, in accordance with some embodiments, for longitudinal pumping of flowing lasing gas 170 in lasing amplifier 130. In such cases, pump beam(s) 152 may enter pump beam edge-defining element(s) 160, being incident with one or more constituent mirrors, optical elements, and/or masks thereof, and subsequently enter lasing amplifier 130 through forward end window 142 (of window assembly 140) for delivery to flowing lasing gas 170 (in lasing amplifier 130). Output beam 10 may enter/exit lasing amplifier 130 through forward end window 142 and rearward end window 144 (of window assembly 140). Output beam 10 may have an intermediate focus point 12. The portion of output beam 10 passing beyond the outer bounds of output coupler 120 may be utilized downstream of system 1000a. Also, downstream of output coupler 120, output beam 10 may include an interior dark region 14 resulting from upstream masking by output coupler 120.

As will be appreciated in light of this disclosure, an arrangement of pump beam sources 150, pump beam optical transport elements and apertures (e.g., beam-shaping optics 190, pump beam edge-defining elements 160), and flowing gas curtains 180 that provides definition of the edges of the amplifier region, together with the configuration of an unstable resonator 100 (e.g., a confocal unstable resonator) that produces an output beam 10 with the same edge surfaces, may allow for amplifier regions with a greater dimensional aspect ratio (e.g., the ratio of the length along output beam 10 to the transverse size). In some cases, the length may be substantially equal to the transverse dimension (e.g., an aspect ratio of unity). In some other cases, the aspect ratio may exceed unity, in some instances significantly.

Transversely Pumped System Architecture and Operation

Figure 10:
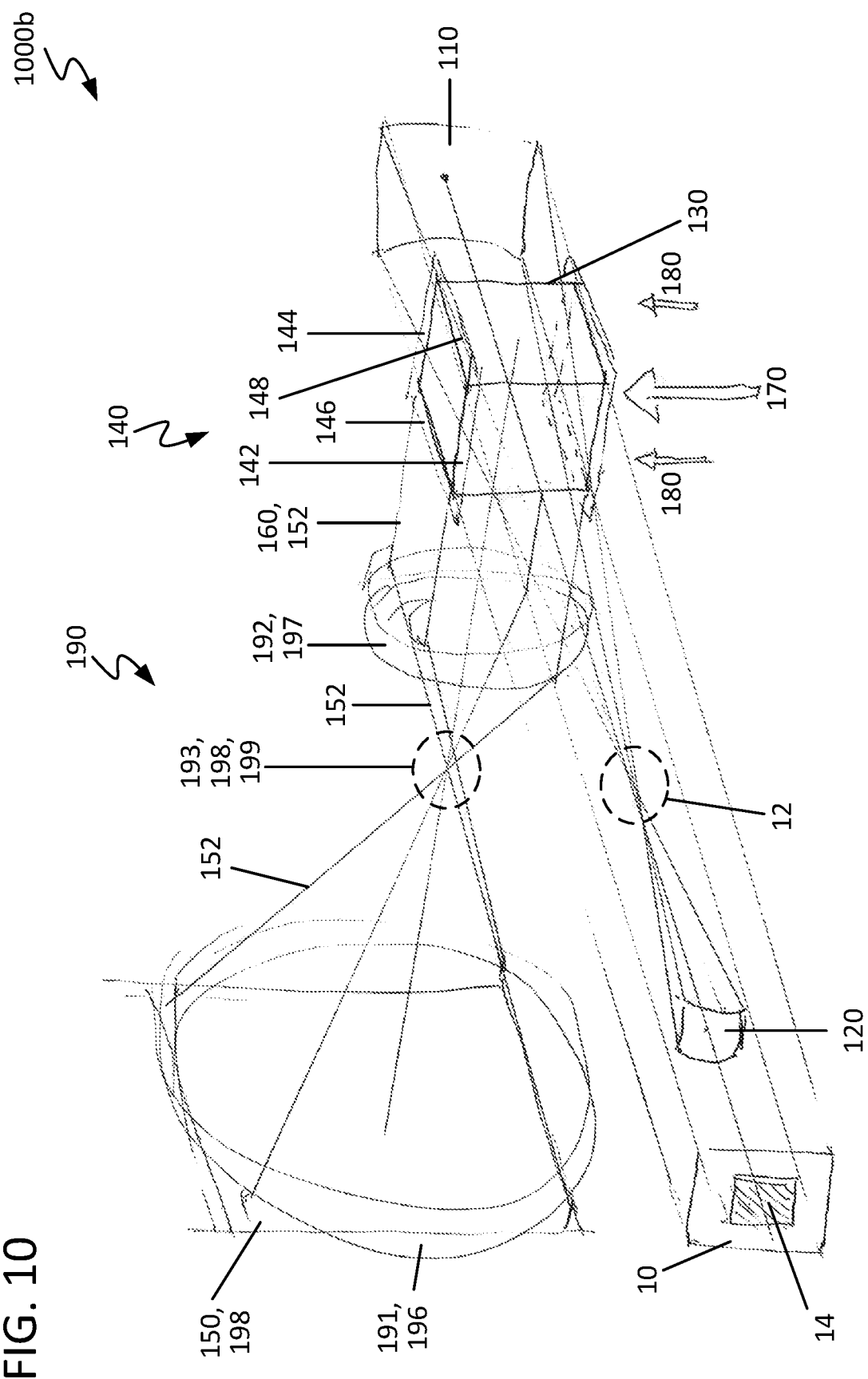
FIG. 10 illustrates a gaseous laser system configured for transverse pumping, in accordance with an embodiment of the present disclosure.

FIG. 10 illustrates a gaseous laser system 1000b configured for transverse pumping in accordance with another embodiment of the present disclosure. As can be seen, system 1000b may be configured much like system 1000a discussed above. As will be appreciated in light of this disclosure, the description provided above with respect to the various constituent elements and characteristics of system 1000a—for instance, unstable resonator 100, lasing amplifier 130, flowing lasing gas 170, flowing gas curtains 180, pump beam sources 150, output beam 10, beam-shaping optic(s) 190 (e.g., lenses, folding mirrors, apertures, diffusers, beam-combining mirrors, etc.), pump beam edge-defining element(s) 160 (e.g., mirrors, optical elements, masks, etc.), etc.— may apply equally here, in part or in whole, in the context of system 1000b, in accordance with some embodiments. As can be seen further, system 1000b may include one or more pump beam sources 150 for transverse pumping of lasing amplifier 130 via one or more pump beams 152. Additionally, system 1000b may include beam-shaping optics 190 (e.g., beam-combining optic 198, diffuser 199) for the fast and slow axes, as well as have fast-axis and slow-axis focus points 193.

As with system 1000a described above, here in system 1000b, lasing amplifier 130 may include a window assembly 140 in which a flowing lasing gas 170 may be provided. Lasing amplifier 130 further may be configured, in accordance with some embodiments, to have one or more flowing gas curtains 180 (e.g., inner flowing gas curtain 180a and/or outer flowing gas curtain 180b) flowing along surface(s) interior to window assembly 140.

In accordance with some embodiments, window assembly 140 of system 1000b may include four optical windows: (1) a forward end window 142 (generally closer to output coupler 120); (2) a rearward end window 144 (generally closer to high-reflectivity mirror 110); (3) a first side window 146; and (4) a second side window 148 (situated substantially opposite first side window 146). It should be noted, however, that the present disclosure is not intended to be so limited, as in accordance with other embodiments, window assembly 140 may include fewer (e.g., 1, 2, or 3) or more (e.g., 5, 6, 7, 8, or more) optical windows, as desired.

Also, as previously noted, a flowing lasing gas 170 may be provided in lasing amplifier 130. More specifically, a gas mixture including at least some concentration of a lasing component (e.g., a gaseous amplifier) may be utilized as flowing lasing gas 170, in accordance with some embodiments.

Furthermore, as previously noted, one or more flowing gas curtains 180 may be provided along interior surface(s) of window assembly 140. More specifically, a flow of a gas depleted or devoid of the lasing component (and, therefore, substantially transparent to pump beam 152 and output beam 10) may be provided to flow over a given optical window through which (i) pump beam 152 and/or (ii) output beam 10 passes in operation of system 1000*b*, in accordance with some embodiments. In some cases, flowing gas curtain 180 may include the same component gases as flowing lasing gas 170, with the exception of being depleted or devoid of the lasing component. In some cases, the depletion of the concentration of the lasing component in the gas of flowing gas curtain 180 may be accomplished by maintaining that gas at a temperature which is lower than that of flowing lasing gas 170. In some cases, flowing gas curtain 180 may be further subdivided so that an inner flowing gas curtain 180*a* is depleted of the lasing component, while an outer flowing gas curtain 180*b* is further depleted of the lasing component. In some cases, inner flowing gas curtain 180*a* and outer flowing gas curtain 180*b* may be maintained at different temperatures. In those cases, inner flowing gas curtain 180*a* may be maintained at a temperature lower than flowing lasing gas 170 so that the concentration of the lasing component is reduced, but not so low a temperature that flow boundary materials that are in contact with both the lasing component of flowing lasing gas 170 and the gas of inner flowing gas curtain 180*a* become sufficiently reduced in temperature as to cause condensation of the lasing component or otherwise alter its concentration. In those cases, outer flowing gas curtain 180*b*, flowing adjacent to the inner surface of the window, may be maintained at a temperature much lower than that of inner flowing gas curtain 180*a* or flowing lasing gas 170, so that it can be maintained essentially devoid of the lasing component.

As with system 1000*a* described above, here in system 1000*b*, the overall configuration of lasing amplifier 130 and arrangement of flowing gas curtain(s) 180 and flowing lasing gas 170 with respect to window assembly 140 may be customized, as desired for a given target application or end-use. For example, consider FIG. 11, which illustrates a partial view of system 1000*b* of FIG. 10, in accordance with an embodiment of the present disclosure. As can be seen here, forward end window 142 and rearward end window 144 may be of substantially rectangular (e.g., rectangular or square) geometry and arranged substantially parallel to one another. As can be seen further, first side window 146 and second side window 148 may be of substantially rectangular (e.g., rectangular or square) geometry and arranged substantially parallel to one another. Thus, windows 142, 144, 146, 148 may be arranged to form a four-sided, open-ended, box-like shape, as generally shown. Flowing lasing gas 170 may flow through lasing amplifier 130 between windows 142, 144, 146, 148.

Figure 11:
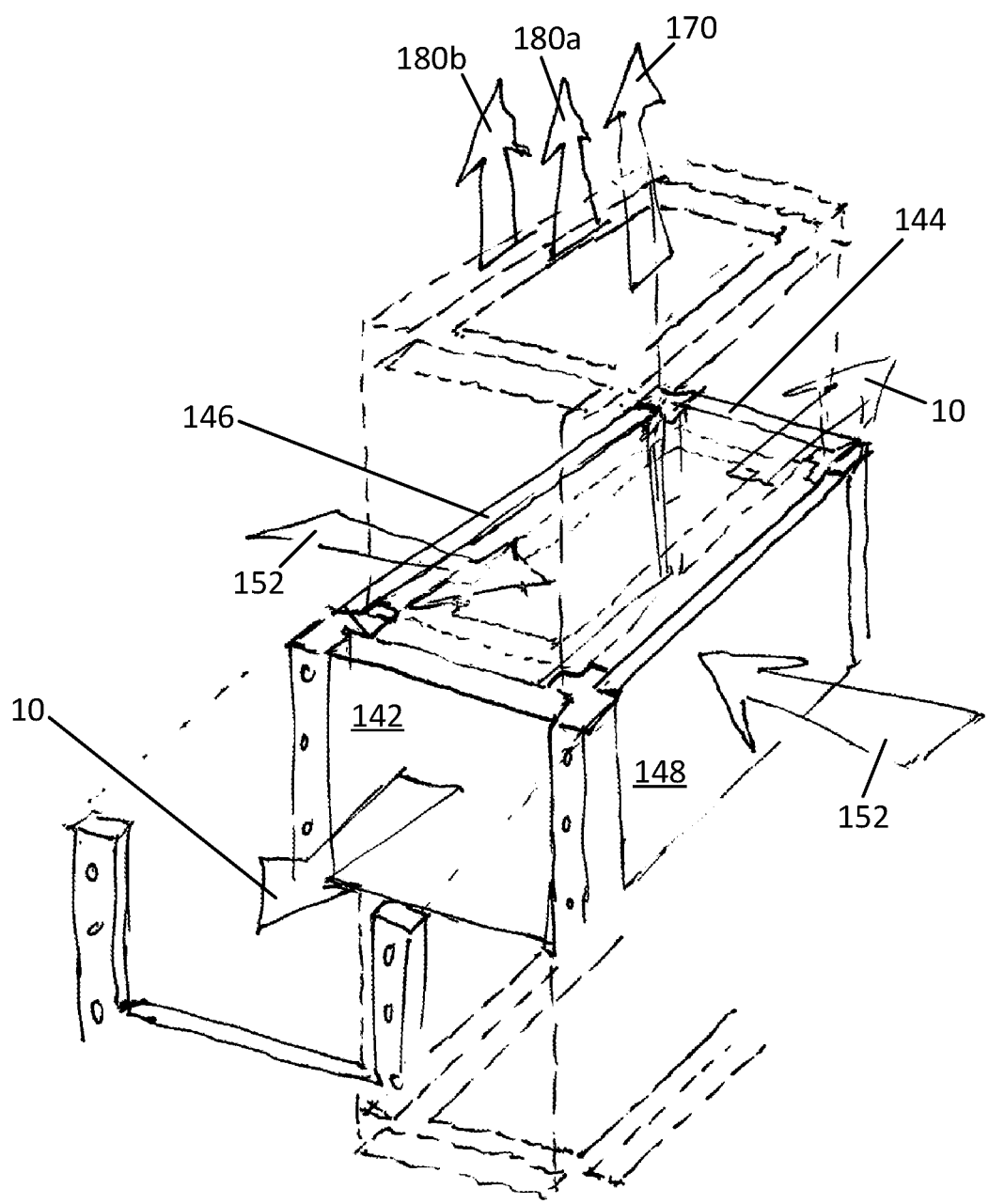
FIG. 11 illustrates a partial view of the system of FIG. 10, in accordance with an embodiment of the present disclosure.

Further regarding the example arrangement of FIG. 11, flowing gas curtain(s) 180 may be provided to flow between flowing lasing gas 170 and (optionally) any or all windows 142, 144, 146, 148. Optionally, a flowing gas curtain 180 between flowing lasing gas 170 and any/all windows 142, 144, 146, 148 may be subdivided into an integer number of subregions, in accordance with some embodiments. For example, if subdivided into two subregions, one flow may be an inner flowing gas curtain 180*a* adjacent to the flow of flowing lasing gas 170 and another flow may be an outer flowing gas curtain 180*b* between that inner flowing gas curtain 180*a* and the inside surface of a given window 142, 144, 146, 148. In the example configuration of FIG. 11, window assembly 140, flowing gas curtains 180, and the lasing volume of flowing lasing gas 170 may exhibit a generally rectilinear shape, where the height and width that define the dimensions of output beam 10 are approximately equal and the length is generally greater than either. In cases where the height and width are equal, then the aspect ratio is defined as the ratio of the length to the transverse dimension. It should be noted, however, that the present disclosure is not intended to be so limited, as in a more general sense, and in accordance with some other embodiments, an asymmetrical beam shape may be desired, and the rectangular box shape may have an aspect ratio that is greater than or less than unity.

As noted above, system 1000*b* may include beam-shaping optic(s) 190. In accordance with some embodiments, beam-shaping optic(s) 190 may be configured to transport pump beam 152 from pump source 150 to flowing lasing gas 170 while altering the dimensions of the pump beam 152 envelope as well as its divergence along the fast and slow axes. In some cases, beam-shaping optic(s) 190 may include one or more elements arranged to de-magnify the fast-axis illumination and magnify the slow-axis illumination. In accordance with some embodiments, beam-shaping optic(s) 190 may be configured as an afocal telescope. In some embodiments, beam-shaping optic(s) 190 may include cylindrical lenses 191, 192, 196, 197 and/or curved mirrors. In some cases, an intermediate focus point 193 optionally may be included. In some embodiments, beam-shaping optic(s) 190 may include cylindrical lens(es) 191, 192, 196, 197, providing an afocal telescope in either (or both) the fast and slow axes, optionally with (1) a focus of the fast-axis rays at a point 193 between the elements that focus along the fast-axis dimension and/or (2) a focus of the slow-axis rays at a point 193 between the elements that focus along the slow-axis dimension. In some embodiments, beam-shaping optic(s) 190 may include one or more mirrors configured to fold the optical path, thereby making it more compact. In some embodiments, beam-shaping optic(s) 190 may include curved mirror(s), providing focusing along one or more axes while also folding the optical path, thereby making it more compact.

As noted above, in some cases, several pump beam sources 150 (e.g., several stacks of laser diode bars) may be utilized. In some instances, it may be desirable to combine pump beams 152 of several pump beam sources 150 so that they form a substantially continuous illumination of flowing lasing gas 170, as if they emanated from a continuous pump beam source. Pump beam 152 combining may involve deflection of an entire pump beam 152 from one or more pump beam sources 150 by unique and differing angles so that the optical rays at the extreme edge of one pump beam 152 are adjacent and in alignment (e.g., having path and trajectory that change smoothly and continuously in both position and angle) with the optical rays at the adjacent extreme edge of the next pump beam 152. In accordance with some embodiments, this may be accomplished by using a multifaceted beam-combining mirror 198. In some embodiments, such mirror 198 may be positioned before the final converging element of beam-shaping optics 190 (e.g., the fast-axis telescope) and may provide deflections in the fast-axis direction. In some embodiments, beam combining may be accomplished using one or more prisms. In some embodiments, the prism(s) may be positioned to deflect in the slow-axis direction and may be positioned close to pump beam source 150 just before the slow-axis divergence causes pump beams 152 from two adjacent pump beam sources 150 to overlap and (optionally) may provide a correcting deflection at the image plane just before side window 146 of window assembly 140. It should be noted, however, that the present disclosure is not intended to be so limited, as in accordance with other embodiments, beam-shaping optic(s) 190 may include fewer (e.g., one) or more (e.g., 3, 4, 5, 6, 7, 8, or more) lenses, mirrors, and/or prisms, as desired.

Furthermore, as noted above, when pump beams 152 are configured to pump a volume from opposite sides while sharing common surfaces at the flow entrance and exit, the transmitted pump beams 152 may enter the optical path of the laser on the opposing side. By canting pump beams 152 from the two sides at a small relative angle (e.g., about 5° or less) while still maintaining those common surfaces as much as practical, the transmitted pump beam 152 may be made to pass through the fast-axis focus 193 at a sufficiently distinct location so that it can be deflected.

The geometry and dimensions of a given lens of beam-shaping optic(s) 190 may be customized, as desired for a given target application or end-use. In accordance with some embodiments, a given amplifier volume, if chosen to be rectilinear and symmetric as to height and width, may have an aspect ratio (e.g., the ratio of the length to the transverse dimension) ranging from about 0.3-50 (e.g., about 2-8 or any other sub-range in the range of about 0.3-50).

As will be appreciated in light of this disclosure, although it may be desirable for diode laser stacks to have a height comprised of many bars, there are challenges to producing stacks with height greater than 20-50 bars (although some provide up to 100 or 150 bars). With the above provisions for combining pump beams 152 from multiple pump beam sources 150 along their fast axis using beam-combining mirror(s) 198, pump beam source 150 arrays easily can incorporate, for instance, eight stacks per side, with clear methods for reaching 32 or even 64 stacks combined along the fast axis, per side widow pump. Furthermore, pump beams 152 from multiple pump beam sources 150 may be combined along their slow axis, easily incorporating, for instance, eight stacks along the beam line. If a design is willing to forgo the divergence-reduction benefits of beam magnifying along the slow-axis (e.g., reducing the divergence in the amplifier so that the end surface is well-defined), then the slow axis may be illuminated simply by the overlap of the divergent beams from many pump beam sources 150, in accordance with some embodiments. In this case, combining two, ten, or even fifty or more stacks along the slow axis may become relatively straightforward, as the illumination pattern may be terminated at the ends (both the end nearest output coupler 120 and the end nearest high-reflectivity mirror 110) by a pump region-defining mirror, to deflect the slow-axis tail of pump beam 152 back into the uniformly illuminated gain region.

As flowing lasing gas 170 may have a single chosen concentration, it may be desirable, at least in some instances, to ensure that the illumination distribution of pump beam(s) 152 is as uniform as possible. However, the optical transport system described above (e.g., beam-shaping optic(s) 190) may include one or more afocal telescopes along one or more of the fast-axis and slow-axis directions, creating an image of pump beam source 150 (near the region of flowing lasing gas 170) which has dark regions between bars and may have localized dark regions due to individual emitters that underperform. To address this, a diffuser 199 optionally may be incorporated into the optical transport system for pump beam 152, in accordance with some embodiments. In some cases, such diffuser 199 may be disposed, for example, near a waist of pump beam 152.

It should be noted, however, that the characteristics of a given component of beam-shaping optic(s) 190 are not intended to be so limited. For example, in some cases, stepped mirror(s) may be utilized to eliminate dark spaces between bars, thereby increasing the illumination intensity without increasing the divergence, in accordance with some embodiments. In some embodiments, pump beams 152 may be prepared from two pump beam sources 150 with polarizations perpendicular to one another and combined through an element that transmits one polarization and reflects the other. In some embodiments, two pump beam sources 150 may be positioned so that their pump beams 152 are spatially offset in the fast-axis direction by one-half-bar spacing and combined using a comb-like reflector, such that pump beams 152 from one stack are reflected on stripes of mirrors while pump beams 152 from the companion offset stack are transmitted through the gaps between those reflective stripes. Other suitable configurations for beam-shaping optic(s) 190 will depend on a given target application or end-use and will be apparent in light of this disclosure.

Pump Beam Intensity Distributions

Returning to FIG. 12A (discussed above), at least one existing approach to producing a DPAL system seeks to confine pump power (100 kW) within a spatial distribution that resembles a Gaussian, having a width as narrow as possible, a central peak illumination as high as possible, and a poorly defined edge. Such a distribution may be accomplished by placing diode stack pump sources close to the amplifier region so that the slow-axis divergence does not spread too much, choosing a stack height along the fast-axis that approximates the desired width, and positioning several stack sources around a quasi-spherical dome, all aimed at the center of the amplifier region. Presuming a FWHM (in both directions) of 3.6 cm, the peak intensity might be very high (as high as 26 kW/cm$^2$) with a portion of that power penetrating flowing lasing gas 170 and emerging out the other end underutilized. The full width at one-tenth maximum (FWTM) would be 6.58 cm, providing an intensity of 2.6 kW/cm$^2$ at a radius of 3.29 cm, with intensity dropping rapidly with radius. At much larger radii, the pump intensity would be insufficient to maintain a population inversion, leading to unity or negative gain. Furthermore, the pump illumination spatial profile forms a waist along the axis at some depth within the amplifier region, with increased transverse dimension near the front and back of the amplifier. It has been observed that the threshold for DPAL lasing is typically on the order of 200 W/cm$^2$ under the right conditions. Pump illuminations of 2.6 kW/cm$^2$ can achieve up to 70-85% efficiency (depending on the spectral linewidth of the pump source, the pressure of the gas medium, and other factors), but only with optimally chosen alkali density. However, raising the alkali density above this level to absorb a significant fraction of the central peak intensity may cause the regions pumped at lower intensity to have incomplete penetration of the pump illumination and, thus, may produce negative gain.

Figure 12A:
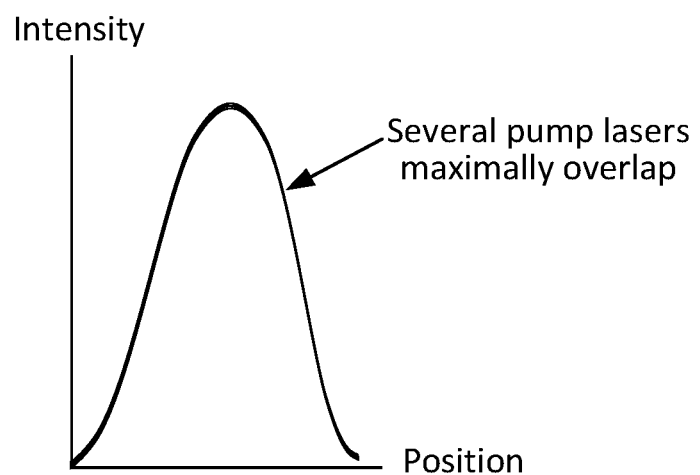
FIG. 12A illustrates an existing approach to pump beam intensity distribution for an existing DPAL system.
Figure 12B:
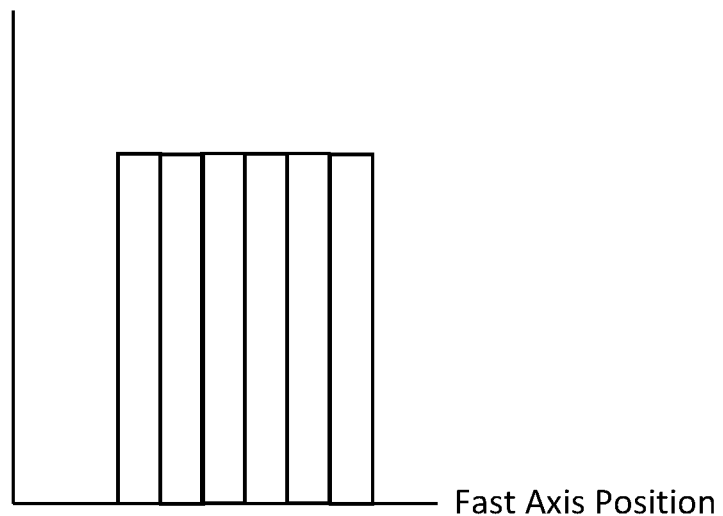
FIGS. 12B-12E illustrate several example pump beam intensity distributions in accordance with some embodiments of the present disclosure.

Contrary to FIG. 12A discussed above, FIGS. 12B-12E illustrate several example pump beam intensity distributions in accordance with some embodiments of the present disclosure. As can be seen from FIG. 12B, the pump beam intensity along the fast axis may be comprised of several segments, each from a different pump source and de-magnified (e.g., concentrated), aimed such that their illumination patterns just touch but do not overlap. Since they are comprised of the de-magnified images of the pump beam sources 150 which are themselves comprised of illuminating bars with dark regions between them, a diffuser 199 placed in the path (optionally near the waist of pump beam 152) may be used to homogenize pump beam 152 output thereby. The edge of the illumination may be defined by the diffused image of the final bar of the final stack in the array of pump beam source 150.

Figure 12C:
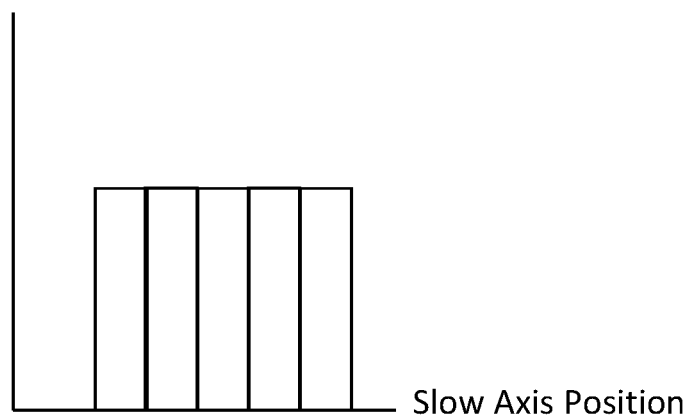

As can be seen from FIG. 12C, the pump beam intensity along the slow axis also may be comprised of several segments, each from a different pump beam source 150, and transported through one or more beam-shaping optics 190 to illuminate the amplifier region of flowing lasing gas 170. In some embodiments, the beam-shaping optics 190 may include an afocal telescope such that an image of the slow axis may be formed near the amplifier region. In some such embodiments, those afocal telescopes may incorporate one or more beam deflectors, such as prisms, to allow their illumination patterns to just touch but not overlap. The edge of the illumination may be formed by the edge of the stack and may diverge through the amplifier region according to the (magnified) divergence of the slow axis. In some embodiments, the array of pump beam source 150 may be required to illuminate an amplifier region that may be quite long, especially in cases of transverse pumping.

Figure 12D:
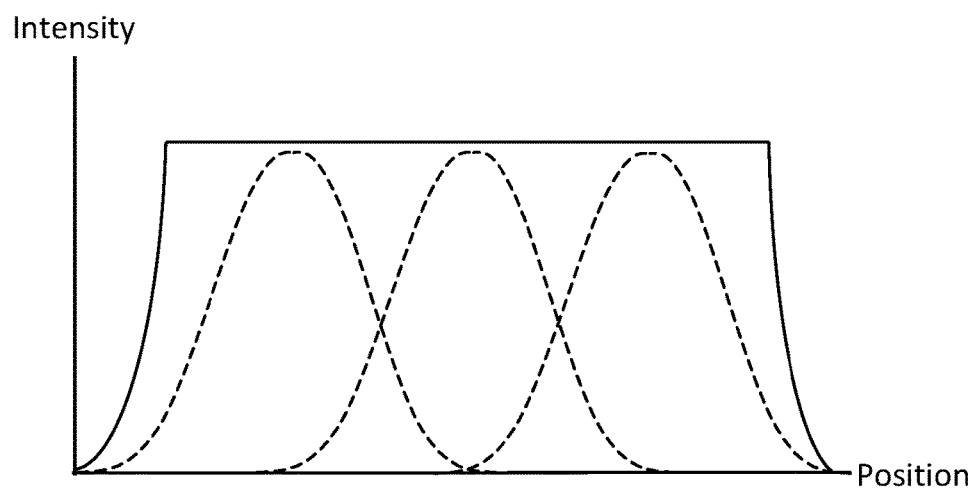
Figure 12E:
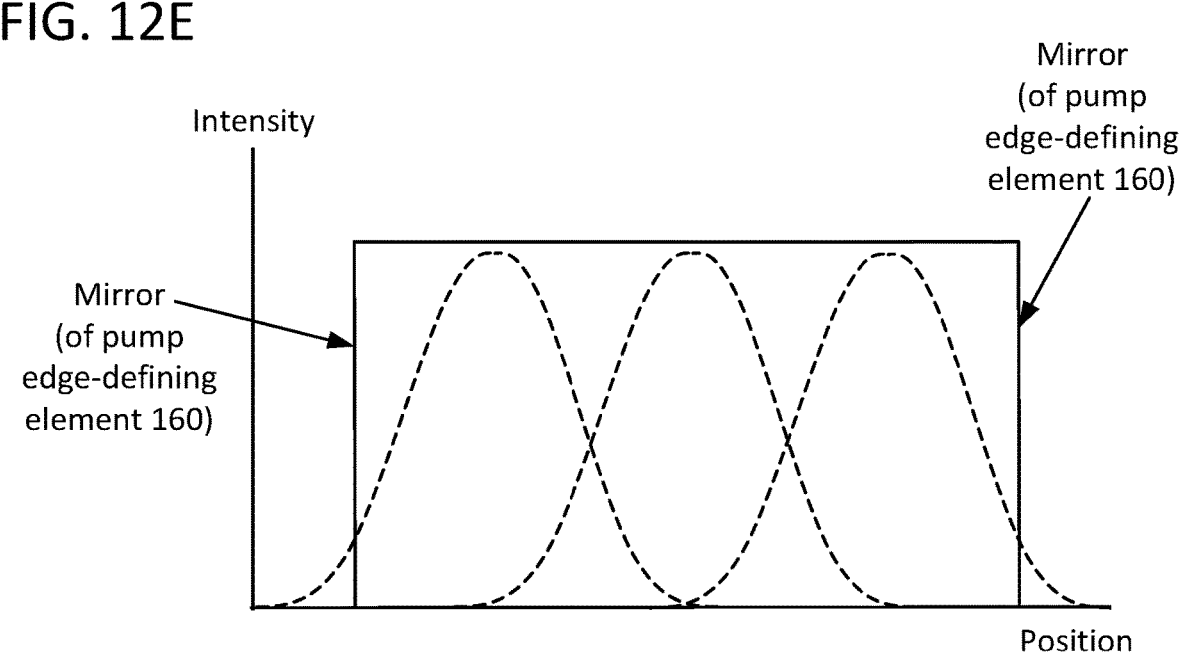

As can be seen from FIG. 12D, the pump beam intensity along the slow axis may be comprised of the overlapping beams projected directly from the pump sources to the illuminated region of flowing lasing gas 170, without slow-axis transport optics. In these cases, the edge of the illumination may not be well-defined but instead may be formed by the projected slow-axis divergence. In these cases, as can be seen from FIG. 12E, it may be beneficial to introduce mirrors at the edge of the slow-axis illumination to produce a well-defined edge and to relocate the divergent pump light back into the illuminated region of flowing lasing gas 170. The arrangement of mirrors may be accomplished by one or more mirrors approximately parallel to the path of the pump rays, deflecting them into the amplifier through small angle reflections, or by two or more mirrors approximately perpendicular to the path of the rays, reflecting them back towards pump beam source 150, and then reflecting again into the illuminated region of flowing lasing gas 170.

It should be noted, however, that these techniques are not intended to be the only approach to accomplishing a well-defined edge of a pump beam 152 that is shared by output beam 10. For example, as will be apparent in light of this disclosure, definition of the edge surfaces may be accomplished using an engineered diffuser 199 to produce a pump beam 152 with uniform intensity and a well-defined edge, in accordance with some embodiments.

Thus, as will be appreciated in light of this disclosure, the example existing approach for longitudinal pumping discussed above in relation to FIG. 12A may be improved upon using techniques disclosed herein, in accordance with some embodiments. For instance, distributing the 100 kW of pump power uniformly, in accordance with some embodiments, at 2.6 kW/cm$^2$ may allow for uniformly illuminating a square region with 6.2 cm on a given side. Because the divergence of the pump beam can be reduced from as much as 45° to about 5° (e.g., the angle required between the transport optics of the pump array and the beam path), the amplifier region can be extended along the beam path from 2 cm to 20 cm, in accordance with some embodiments. In accordance with some embodiments, the alkali density may be chosen to maximize the gain for this illumination intensity and may be a much lower alkali density than in the aforementioned existing approach. Moreover, greater length of the amplification region, lower peak pump intensity, lower peak beam intensity, and lower alkali density may produce lower levels of parasitic physics processes, such as energy pooling, ionization, and amplified spontaneous emission (ASE), in accordance with some embodiments.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A gaseous laser system comprising:
a pump beam source configured to emit a pump beam having at least one edge surface; and
an unstable resonator configured to produce an output beam having at least one edge surface defined by a drop in intensity that is more abrupt than that of a Gaussian profile;
wherein the gaseous laser system is configured to have a gas mixture flowing therethrough, the gas mixture comprising a gas and an active lasing agent; and
wherein a spatial volume defined by intersection of the pump beam, the flowing gas mixture, and the output beam forms a lasing amplifier, wherein at least a portion of an outer boundary of the spatial volume of the lasing amplifier is defined by and shared with the at least one edge surface of the pump beam and the at least one edge surface of the output beam.

2. The gaseous laser system of claim 1, further comprising an edge-defining element configured to define an edge of the pump beam, wherein the edge-defining element comprises at least one of a mirror, a lens, and a mask disposed near an intersection of the pump beam and an optical pathway of the unstable resonator and configured to have the pump beam incident therewith.

3. The gaseous laser system of claim 2, wherein the at least one of a mirror, a lens, and a mask is configured to intersect with at least a portion of the pump beam so as to define the edge thereof.

4. The gaseous laser system of claim 1, further comprising an edge-defining element configured to define an edge of the pump beam, wherein the edge-defining element comprises an assembly of optical elements disposed outside of an optical pathway of the unstable resonator and configured to have the pump beam pass therethrough.

5. The gaseous laser system of claim 4, wherein the assembly of optical elements is configured to at least one of refractively optically transport and reflectively optically transport at least a portion of the pump beam so as to define the edge thereof.

6. The gaseous laser system of claim 4, wherein the assembly of optical elements is configured to form an image of at least a portion of the pump beam so as to define the edge thereof.

7. The gaseous laser system of claim 1, further comprising an optical window assembly through which the gas mixture flows in operation of the gaseous laser system, wherein the gaseous laser system is configured to have at least one flowing gas curtain pass over an interior surface of the optical window assembly in a region through which the pump beam passes in operation of the gaseous laser system.

8. The gaseous laser system of claim 7, wherein the at least one flowing gas curtain comprises an inactive gas.

9. The gaseous laser system of claim 7, wherein the at least one flowing gas curtain is configured to have the pump beam incident therewith so as to define an edge of the pump beam.

10. The gaseous laser system of claim 1, wherein the gaseous laser system is configured as a diode-pumped alkali laser (DPAL) and the active lasing agent comprises a vapor of an alkali metal.

11. The gaseous laser system of claim 1, wherein the lasing amplifier is bounded with a first edge surface on a first side thereof and a second edge surface on an opposing second side thereof, the spatial volume residing between said first and second edge surfaces, wherein said first and second edge surfaces are formed by and co-located with the at least one edge surface of the pump beam and the at least one edge surface of the output beam.

12. The gaseous laser system of claim 1, wherein the lasing amplifier is bounded by at least one edge surface defined by an abrupt transition in concentration of the active lasing agent in the gas mixture.

13. The gaseous laser system of claim 12, wherein the lasing amplifier is bounded by:
at least two edge surfaces on opposites sides which are formed by and co-located with the at least one edge surface defined by the abrupt transition in concentration of the active lasing agent in the gas mixture; and
at least two edge surfaces on opposite sides which are formed by and co-located with the at least one edge surface of the pump beam and the at least one edge surface of the output beam.

14. A method of operating a gaseous laser system, the method comprising:
emitting a pump beam having at least one edge surface;
producing an output beam having at least one edge surface defined by a drop in intensity that is more abrupt than that of a Gaussian profile; and
providing a flowing gas mixture comprising a gas and an active lasing agent;
wherein a spatial volume defined by intersection of the pump beam, the flowing gas mixture, and the output beam forms a lasing amplifier, wherein at least a portion of an outer boundary of the spatial volume of the lasing amplifier is defined by and shared with the at least one edge surface of the pump beam and the at least one edge surface of the output beam.

15. The method of claim 14, further comprising:
defining an edge of the pump beam via at least one of a reflection process, an image forming process, and a masking process.

16. The method of claim 14, further comprising:
defining an edge of the pump beam via at least one of a refractive optical transport process and a reflective optical transport process.

17. The method of claim 16, wherein the at least one of the refractive optical transport and the reflective optical transport process comprises:
focusing the pump beam through at least one lens before delivering the resultant pump beam to the flowing gas mixture.

18. The method of claim 14, further comprising:
passing the pump beam through at least one flowing gas curtain provided adjacent to the flowing gas mixture.

19. The method of claim 18, wherein the at least one flowing gas curtain comprises an inactive gas.

20. The method of claim 14, wherein the gaseous laser system is configured as a diode-pumped alkali laser (DPAL) and the active lasing agent comprises a vapor of an alkali metal.

21. A gaseous laser system comprising:
a pump beam source configured to emit a pump beam having at least one edge surface; and
an unstable resonator configured to produce an output beam having at least one edge surface defined by a drop in intensity that is more abrupt than that of a Gaussian profile;
wherein the gaseous laser system is configured to have a gas mixture flowing therethrough, the gas mixture comprising a gas and an active lasing agent; and
wherein the flowing gas mixture has at least one edge surface defined by an abrupt transition in concentration of the active lasing agent in the gas mixture, wherein said at least one edge surface is a shared edge surface shared by at least one of:
the at least one edge surface of the pump beam; and
the at least one edge surface of the output beam.

22. The gaseous laser system of claim 21, wherein:
a spatial volume defined by intersection of the pump beam, the flowing gas mixture, and the output beam forms a lasing amplifier; and
the lasing amplifier is bounded with a first edge surface on a first side thereof and a second edge surface on an opposing second side thereof, the spatial volume residing between said first and second edge surfaces, wherein said first and second edge surfaces are formed by and co-located with the at least one edge surface defined by the abrupt transition in concentration of the active lasing agent in the gas mixture and the at least one edge surface of the pump beam.

23. The gaseous laser system of claim 21, wherein:
a spatial volume defined by intersection of the pump beam, the flowing gas mixture, and the output beam forms a lasing amplifier; and
the lasing amplifier is bounded with a first edge surface on a first side thereof and a second edge surface on an opposing second side thereof, the spatial volume residing between said first and second edge surfaces, wherein said first and second edge surfaces are formed by and co-located with the at least one edge surface defined by the abrupt transition in concentration of the active lasing agent in the gas mixture and the at least one edge surface of the output beam.

24. The gaseous laser system of claim 21, wherein:
a spatial volume defined by intersection of the pump beam, the flowing gas mixture, and the output beam forms a lasing amplifier; and
the lasing amplifier is substantially rectilinear in geometry, being bounded with:
two edge surfaces on opposite sides which are formed by and co-located with the at least one edge surface defined by the abrupt transition in concentration of the active lasing agent in the gas mixture and the at least one edge surface of the output beam;
two edge surfaces on opposite sides which are formed by and co-located with the at least one edge surface defined by the abrupt transition in concentration of the active lasing agent in the gas mixture and the at least one edge surface of the pump beam; and
two edge surfaces on opposite sides which are formed by and co-located with the at least one edge surface of the pump beam and the at least one edge surface of the output beam.

* * * * *